United States Patent
Colrain et al.

(10) Patent No.: US 9,779,116 B2
(45) Date of Patent: ***Oct. 3, 2017

(54) RECOVERING STATEFUL READ-ONLY DATABASE SESSIONS

(71) Applicant: Oracle International Corporation, Redwood Shores, CA (US)

(72) Inventors: Carol L. Colrain, Redwood Shores, CA (US); Kevin S. Neel, San Mateo, CA (US); Tong Zhou, Merrick, NY (US); Douglas N. Surber, Orinda, CA (US); Stefan Heinrich Roesch, San Mateo, CA (US); Nancy R. Ikeda, Los Altos Hills, CA (US); Paul Parkinson, Mount Laurel, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/936,061

(22) Filed: Jul. 5, 2013

(65) Prior Publication Data

US 2013/0297566 A1 Nov. 7, 2013
US 2016/0321304 A9 Nov. 3, 2016

Related U.S. Application Data

(63) Continuation of application No. 13/229,641, filed on Sep. 9, 2011, now Pat. No. 8,549,154.

(51) Int. Cl.
*G06F 17/30* (2006.01)

(52) U.S. Cl.
CPC .. *G06F 17/30289* (2013.01); *G06F 17/30371* (2013.01)

(58) Field of Classification Search
USPC .................................................. 707/227, 238
See application file for complete search history.

(56) References Cited

U.S. PATENT DOCUMENTS

| | | |
|---|---|---|
| 6,041,357 A | 3/2000 | Kunzelman |
| 6,442,552 B1 | 8/2002 | Frolund et al. |

(Continued)

OTHER PUBLICATIONS

U.S. Appl. No. 13/448,258, filed Apr. 16, 2012, Office Action, May 27, 2014.

(Continued)

*Primary Examiner* — Kim Nguyen
(74) *Attorney, Agent, or Firm* — Hickman Palermo Becker Bingham LLP

(57) ABSTRACT

A process, apparatus, and computer-readable medium are provided for rebuilding a database session when a previous database session becomes unavailable and the commands previously sent for execution on the previous database session satisfy certain criteria. The process includes determining whether or not a set of commands sent by a client for execution on the previous database session is acceptable to replay based at least in part on whether or not the set of commands satisfies one or more criteria. The process further includes determining that the previous database session is unavailable due to a planned or unplanned recoverable error. In response to determining that the previous database session is unavailable, if the set of commands is acceptable for replay, the set of commands is sent for execution on a new database session to rebuild the state, which was exposed to the client from the previous database session, on the new database session. The process masks the outage from the application.

22 Claims, 6 Drawing Sheets

(56) References Cited

U.S. PATENT DOCUMENTS

| | | | |
|---|---|---|---|
| 6,728,747 B1* | 4/2004 | Jenkins | G06F 11/2028 707/999.01 |
| 7,415,470 B2 | 8/2008 | Kasamsetty et al. | |
| 7,502,824 B2 | 3/2009 | Kaluskar et al. | |
| 7,536,462 B2* | 5/2009 | Pandya | H04L 29/06 709/227 |
| 7,539,746 B2 | 5/2009 | Bankier et al. | |
| 7,552,218 B2* | 6/2009 | Kaluskar | G06F 17/30575 709/227 |
| 7,631,107 B2* | 12/2009 | Pandya | H04L 29/06 370/389 |
| 7,634,512 B2 | 12/2009 | Cao et al. | |
| 7,747,754 B2 | 6/2010 | Kaluskar et al. | |
| 7,761,435 B2* | 7/2010 | Stanev | G06F 9/461 707/705 |
| 7,849,173 B1* | 12/2010 | Uhlik | H04L 12/14 709/223 |
| 7,849,177 B2* | 12/2010 | Uhlik | H04L 12/14 709/223 |
| 7,853,698 B2* | 12/2010 | Stanev | G06F 9/4435 709/227 |
| 7,890,457 B2 | 2/2011 | Dias et al. | |
| 7,890,458 B2 | 2/2011 | Dias et al. | |
| 8,005,966 B2* | 8/2011 | Pandya | H04L 29/06 709/223 |
| 9,323,922 B2* | 4/2016 | Muralidharan | G06F 21/55 |
| 2003/0028654 A1 | 2/2003 | Abjanic et al. | |
| 2003/0131045 A1 | 7/2003 | McGee et al. | |
| 2003/0204769 A1 | 10/2003 | Coughlin | |
| 2004/0216109 A1 | 10/2004 | Bhogi et al. | |
| 2005/0021514 A1 | 1/2005 | Barga et al. | |
| 2005/0038848 A1 | 2/2005 | Kaluskar | |
| 2005/0228834 A1 | 10/2005 | Shinkai | |
| 2006/0036617 A1 | 2/2006 | Bastawala | |
| 2007/0067266 A1 | 3/2007 | Lomet | |
| 2007/0226218 A1 | 9/2007 | Chatterjee et al. | |
| 2007/0261054 A1 | 11/2007 | Chesebro et al. | |
| 2008/0010240 A1* | 1/2008 | Zait | G06F 17/30463 |
| 2008/0097960 A1 | 4/2008 | Dias et al. | |
| 2008/0097995 A1 | 4/2008 | Dias et al. | |
| 2008/0098048 A1* | 4/2008 | Cao | G06F 17/30306 |
| 2008/0134219 A1 | 6/2008 | Dorrance et al. | |
| 2008/0228834 A1 | 9/2008 | Burchall et al. | |
| 2009/0077135 A1 | 3/2009 | Yalamanchi et al. | |
| 2010/0030818 A1 | 2/2010 | Cooper et al. | |
| 2010/0042601 A1 | 2/2010 | Kelley et al. | |
| 2010/0293137 A1 | 11/2010 | Zuckerman et al. | |
| 2010/0318394 A1 | 12/2010 | Nayak et al. | |
| 2011/0212783 A1 | 9/2011 | Dale | |
| 2011/0218981 A1 | 9/2011 | Retnakumari et al. | |
| 2011/0276550 A1 | 11/2011 | Colle et al. | |
| 2012/0179645 A1 | 7/2012 | Lomet et al. | |
| 2013/0066948 A1 | 3/2013 | Colrain et al. | |
| 2013/0066949 A1 | 3/2013 | Colrain et al. | |
| 2013/0066952 A1 | 3/2013 | Colrain et al. | |
| 2013/0066955 A1 | 3/2013 | Neel | |
| 2013/0304714 A1 | 11/2013 | Lee et al. | |
| 2014/0095547 A1 | 4/2014 | Guo et al. | |
| 2014/0229531 A1 | 8/2014 | Neel et al. | |

OTHER PUBLICATIONS

U.S. Appl. No. 14/231,347, filed Mar. 31, 2014, Office Action, Nov. 19, 2014.

U.S. Appl. No. 13/448,258, filed Apr. 16, 2012, Notice of Allowance, Oct. 30, 2014.

"28 Transparent Application Failover", Oracle® Database JDBC Developer's Guide and Reference 10g Release 2 (10.2) Part No. B14355-04 downloaded from the Internet on Jul. 25, 2011 < http://download.oracle.com/docs/cd/B19306_01/java.102/b14355/ocitaf.htm > dated 1999 (3 pages).

U.S. Appl. No. 13/448,258, filed Apr. 16, 2012, Office Action, Nov. 27, 2013.

U.S. Appl. No. 13/563,680, filed Jul. 31, 2012, Notice of Allowance, Dec. 23, 2013.

\* cited by examiner

RECOVERING STATEFUL READ-ONLY DATABASE SESSIONS

BENEFIT CLAIM; CROSS-REFERENCE TO RELATED APPLICATIONS

This application claims benefit and priority under 35 U.S.C. §120 as a Continuation of application Ser. No. 13/229,641, entitled "Recovering Stateful Read-Only Database Sessions," filed Sep. 9, 2011, the entire contents of which is hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

CROSS-REFERENCE TO RELATED APPLICATIONS

This application is related to (1) U.S. Pat. No. 7,747,754, entitled "Transparent Migration Of Stateless Sessions Across Servers," filed Aug. 12, 2004, the entire contents of which is incorporated by reference herein in its entirety; (2) U.S. Pat. No. 7,502,824, entitled "Database Shutdown With Session Migration," filed May 1, 2006; (3) U.S. Pat. No. 7,552,218, entitled "Transparent Session Migration Across Servers," filed Aug. 12, 2004, the entire contents of which is incorporated by reference herein in its entirety; (4) U.S. Pat. No. 7,415,470, entitled "Capturing And Re-Creating The State Of A Queue When Migrating A Session," filed May 17, 2005, the entire contents of which is incorporated by reference herein in its entirety; (5) U.S. Pat. No. 7,634,512, entitled "Migrating Temporary Data Of A Session," filed Apr. 4, 2007, the entire contents of which is incorporated by reference herein in its entirety; (6) U.S. patent application Ser. No. 13/076,313, entitled "Application Workload Capture And Replay System," filed Mar. 30, 2011, the entire contents of which is incorporated by reference herein in its entirety.

FIELD OF THE INVENTION

The present invention relates to recovering state for a database session that has become unavailable.

BACKGROUND

Database Instances

A database comprises data and metadata that is stored on one or more storage devices, such as a hard disk, a stick of random access memory, a cluster or a cloud storage system. Such data and metadata may be stored in a database logically, for example, according to relational and/or object-relational database constructs. A database application interacts with an instance of a database server ("database instance") by submitting, to the database instance, commands that cause the database instance to perform operations on data stored in a database. A database command is a request to access or modify data from a database. The command may cause the database instance to perform operations on the data in the database and/or return the data from the database.

In a multi-node database system, a database may be served by multiple database instances, and each database instance may be configured to access all or part of the database. An instance of a server is a combination of integrated software components, such as one or more processes executing on one or more computing devices, and an allocation of computational resources, such as memory, storage, or processor cycles, for executing the integrated software components on a processor. A database instance is a combination of integrated software components and an allocation of computational resources for accessing, modifying, or otherwise using a database. Database instances may be grouped into logical domains called services. Multiple database instances may be installed or configured on a single machine or on separate machines. When processing database commands, a database instance may access the database or a cache of information from the database. In one example, the database is stored in non-volatile memory, and the cache is stored in volatile memory.

When multiple database instances share access to the same data, a database instance may lock a portion of the database while the portion is in use by the database instance. For example, the database instance may lock the portion for exclusive read and/or write access, and other database instances are prevented from accessing and/or modifying the portion while the portion is locked. The database instance then releases the lock when the database instance is finished accessing and/or modifying that portion of the database. After the lock is released, other instances may access and/or modify the portion or obtain a lock on the portion.

Database commands may be submitted to the database instance in the form of database statements that conform to a database language supported by the database instance. One non-limiting example of a database language supported by many database instances is a Data Manipulation Language ("DML") called Structured Query Language ("SQL"), including proprietary forms of SQL supported by such database servers as Oracle®, (e.g. Oracle® Database 11 g). SQL data definition language ("DDL") instructions are issued to a database server to create or configure database objects, such as tables, views, or complex types. Although SQL is mentioned as one example, there are many other example database languages and exposed interfaces to the database, any of which may be used in conjunction with the techniques described herein.

Procedural Language/Structured Query Language ("PL/SQL") extends SQL by providing constructs found in procedural languages, resulting in a structural language that is more powerful than standard SQL. PL/SQL commands are organized into blocks of variable declarations, sub-commands that include procedural and SQL commands, and exception-handling commands. PL/SQL commands may be sent to a database server to cause the database server to perform a variety of actions as the PL/SQL commands are executed. The database server may also receive and execute Java-based commands, or commands that conform to other programming languages or constructs.

Multiple database commands may be sent from a database client to the database instance in a single request to perform work. The database commands may be processed by the database instance, and the database instance may return results to the database client in a single response to all commands that were submitted in the request. Handling multiple commands in a single roundtrip request and response may result in an efficient use of database connections. In other words, clients generally use database connections to submit requests less frequently when multiple commands are allowed to be submitted on the requests that use the database connections.

Applications and Logical Connections

Servers, such as mid-tier servers, provide database instance connections to applications that request information from a database. A mid-tier server is a server that provides access to one or more database servers, distributes work to one or more database servers, or manages connections to one or more database servers. An application is any logic running on one or more computing devices that uses a database connection to retrieve information from the database. The retrieved information may be presented or displayed to a user of the application. For example, the application may be accessed from a browser, where the application receives input from the user and presents information to the user. The application may be an application that is accessed through a web portal, over a network, by the user, an application that is installed on a machine of the user, or an application that is distributed among multiple machines.

In one example, an Oracle® Fusion® Application is specially configured to retrieve data from an Oracle® database, and display the information to a user of the Fusion® Application. Applications other than Oracle® Fusion® Applications currently exist, and other database applications may be developed in the future without departing from the present disclosure.

In one example, an application issues a request to a mid-tier server for data from a database. The request may or may not be sent in response to user input. The mid-tier server selects a free connection from a connection pool of free connections to database instances. A database connection that has been selected and/or customized for use by a client or group of clients is referred to herein as a "database session." A database connection may be customized to meet particular needs as a database session for a particular client, or the connection may be generalized such that the connection can be used to support a variety of database sessions for a variety of clients. The mid-tier server sends the client request on the selected connection to a database instance, and the database instance accesses a database to handle the request. The database server processes the request by retrieving or modifying data in the database or by retrieving or modifying the data in a cache of data from the database. The database server establishes state for the database session as the database server processes the request.

Mid-tier servers often maintain connection pools, which include connections to database instances. The connection may refer to either a physical mechanism, such as a physical port, or a logical configuration, or both. There may be a one-to-one mapping of logical connections (i.e., database sessions) to physical connections. On the other hand, there may be more than one logical connection associated with a single physical connection. In one example, the free connections in the connection pool include only those connections that are not allocated to applications for processing requests. As work completes, connections are returned to the connection pool and are available for subsequent applications to borrow from the pool.

In one example, the mid-tier server assigns a logical connection to an application that is requesting access to the database. The logical connection is mapped, directly or indirectly, to one of a plurality of physical connections. The logical connection may be re-assigned to new physical connections without re-assigning a new logical connection to the application. The logical connection may be exposed to the application, and the application may continue to reference the same logical connection as the underlying physical connections change. In one example, a particular logical connection is represented as a connection object that is exposed to the application and that is mapped to another connection object, which may or may not be exposed to the application, and which may or may not be another logical connection. Through a hierarchy of logical connections, the particular logical connection is mapped to a physical connection.

Effect of Database Session Unavailability on the Application

As an application uses a database session to access a database, the application builds up state on the database session. For example, application uses the database session to obtain locks, create temporary variables or database objects, establish user-specific information, establish application-specific information, establish cursor information, create temporary arrangements or selections of data, and/or perform other partially completed operations on data for further processing in the database session. If the database session fails before the further processing occurs, the locks, temporary variables or database objects, user-specific information, application-specific information, cursor information, temporary arrangements or selections of data, and/or the partially completed operations become unavailable to the application, even if the application attempts to reference this information in a new database session.

In one example, the database session may fail or otherwise becomes unavailable if a database instance upon which the database session depends fails or otherwise becomes unavailable. In many cases, failure of the database session causes the application to fail in order to avoid corrupting data in the database, and the user must restart the application or components of the application and start over with obtaining locks, creating temporary variables or database objects, establishing user-specific information, establishing application-specific information, establishing cursor information, creating temporary arrangements or selections of data, and/or partially completing operations on data for further processing in the database session. In one example, upon failure of the database session, the user may be left hanging with a blue screen or interrupted with an error message.

In another example, once the database session has failed, the user may be prevented from entering any information or causing any commands to be submitted to the database before the page is reloaded. Also, reloading the page without checking what data was stored to the database could lead to a duplicate submission. The application may prevent the user from submitting any commands that depend on the state that was lost in the failed database session or may misbehave if needed information is no longer available. In a particular example, fields already presented to the user may be grayed to indicate that, in order to avoid corrupting data stored in the database, the fields can no longer be modified by the application.

Even if the database session fails over to a second database instance, the second database instance may not have any information about the database session beyond what was committed to the database prior to the failure. In order to avoid corrupting the data in the database, applications may reset the information that is displayed to the user to information that matches the data already committed to the database. In other words, when a database instance fails, a user may lose temporary information that would have been available to the user just prior to the failure. Some of the lost information may correspond to information that was being displayed, modified, selected, or arranged by the application and/or user that was using a now unavailable database session, or information that was about to be returned to the application and/or user on the now unavailable database session. The user is often forced to re-enter fields of data again.

The loss of information already entered, modified, selected, and/or arranged by a user may result in user frustration and wasted time in re-entry, re-modification, re-selection, and/or re-arrangement of the information after the application or application component has restarted. The lost information may be information that was retrieved by the user from others, for example, by video, voice, email, or text message. In some cases, the lost information may no longer be retrievable. Losing information can be particularly costly when the user is being assisted by a support service provider as the failure occurs. Loss of information may require further communications with the support service provider, or may even cause the user to lose faith in the reliability of the application, the mid-tier server, or the database server, or the company that provides the application, the mid-tier server, and/or the database server. Further, the user may be selecting, entering, or modifying time-sensitive information prior to failure. Requiring the user to re-enter the time-sensitive information after the failure may result in a delay that causes loss of business, value, or reputation of the user to business clients or business ventures of the user. Requiring re-entry may also result in a loss of opportunity for the user. For example, the user may miss out on items or opportunities that the user had previously selected.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
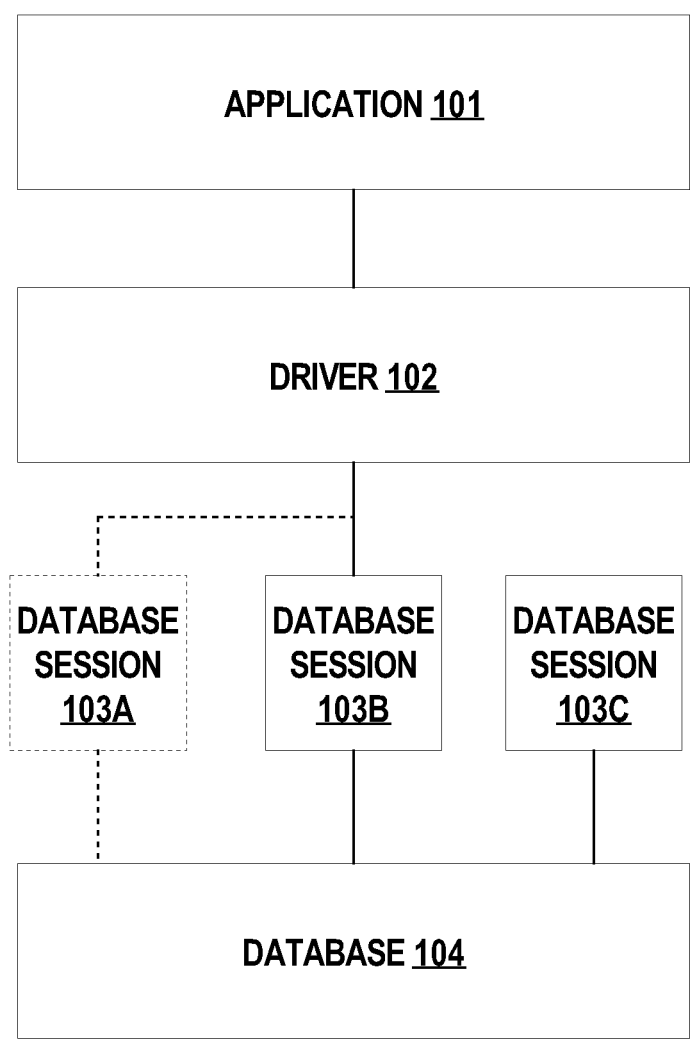
FIG. 1 illustrates an example database system that allows an application to access a database in a database session.

In the following description, for the purposes of explanation, numerous specific details are set forth in order to provide a thorough understanding of the present invention.

It will be apparent, however, that the present invention may be practiced without these specific details. In other instances, well-known structures and devices are shown in block diagram form in order to avoid unnecessarily obscuring the present invention.

General Overview

Techniques are disclosed herein for recovering state on a new database session when commands previously submitted on a previous database session satisfy certain criteria. Although the techniques may be described with reference to specific embodiments, the functionality described herein may be provided by the performance of a set of one or more processes, by a set of one or more stored instructions that, when executed, cause performance of the processes, or by a set of one or more machines specially configured to perform the processes. The process includes determining whether or not a set of commands sent by a client for execution on the previous database session is acceptable to replay based at least in part on whether or not the set of commands satisfies one or more criteria. In one embodiment, any given command of the set of commands that satisfies the one or more criteria may disqualify the entire set of commands for replay. The process further includes determining that the previous database session is not available. In response to determining that the previous database session is not available, if the set of commands is acceptable for replay, the set of commands is sent for execution on a new database session to rebuild client-visible state, or state that could have been exposed to the client on the previous database session, on the new database session, and/or to resubmit and complete a failed transaction, and/or to retrieve data lost from the commands sent to the previous session. If the state has been successfully rebuilt on the second database session, the second database session may be used for execution of further commands sent by the client. For example, after sending the set of commands for execution on the new database session, one or more other commands may be sent for execution on the new database session. The one or more other commands may depend on the state that was exposed to the client on the previous database session. One or more other commands may be executed on the rebuilt session even if the one or more other commands depend on the state that was exposed to the client on the previous database session. Thus, the process masks the outage from the application.

In one embodiment, operation of the application is delayed while, in a manner that is optionally transparent to the application and/or to the user, the set of commands is replayed on the second database session. Operation of the application resumes when replay of the set of commands has completed. Once operation of the application has resumed, the application may submit further commands on the second database session and receive further results on the second database session in response to execution of the further commands. In one embodiment, the application does not need to receive any information that indicates the first database session has failed over to the second database session. For example, the application may be unaware that a first database instance executing commands on the first database session has failed and been replaced by a second database instance executing the commands on the second database session. Beyond the consumption of time and resources to replay the commands, the failover might not have any effect on the application or the user. Further commands submitted by the application on the second database session may depend on session state information that was created as a result of replaying the commands on the second database session, and matches or substantively matches the session state that existed on the first database session when the first database session became unavailable. Information that is accessible to the application, including optionally information that is displayed to, created by, modified by, arranged by, or selected by the user, may be further modified, selected, or arranged by commands that depend on session state that was developed on the first database session and restored to the second database session. In particular examples, recovering the session state may recover locks that were obtained prior to unavailability of the first database session, temporary variables or objects that were created prior to unavailability of the first database session, user-specific information that was established prior to unavailability of the first database session, application-specific information that was established prior to unavailability of the first database session, cursor information that was established prior to unavailability of the first database session, temporary arrangements or selections of data that were established prior to unavailability of the first database session, and/or partially completed or uncommitted operations on data (such as insert, update, or delete) submitted prior to unavailability of the first database session.

Without recovering the database session state, the user may otherwise be prevented from further modifying, selecting, or arranging data by executing commands that depend on session state that was developed on the first database session. For example, when the first database session fails, without replay, fields of the application may be grayed out to the user, indicating that the fields cannot be further modified. As another example, when the first database session fails, without replay, the application may crash or, worse, corrupt the data stored in the database by falsely assuming that a new database session is aware of the session state that existed on the first database session.

To the user and/or to the application, recovering commands to re-establish the state of a database session appears merely as a delay in operation of the application. Causing a delay in operation of the application, while the commands are recovered to re-build the database session state, is an acceptable consequence of re-establishing the database session state when a database session being used by the application becomes unavailable. Logical corruption of the data may occur if recovery is not performed, or if recovery is not performed correctly. If the state of a database session is lost when the database session becomes unavailable, then the application might be affected by more than a mere delay in execution. Losing session state may corrupt the application, resulting in application failure, unexpected rollback and loss of information already entered, or, worse, corruption of information stored in the database. Further, applications may be delayed for any number of reasons other than for preservation of session state during a replay of commands. For example, applications may be delayed while waiting for a connection, while waiting for results, or while some other computation or communication is being performed relating to functionality of the application.

In one embodiment, the process includes receiving, on the first database session, a first set of results in response to the set of commands that were sent on the first database session. The process also includes receiving, on the second database session, a second set of results in response to the set of commands that were replayed on the second database session. The process includes determining whether the first set of results matches the second set of results. If the first set of results matches the second set of results, the process includes causing operation of the application to resume with session state preserved. Otherwise, if replay of the commands did not produce the same results as when the commands were originally executed, the second database session may not have correctly restored client-side state information that was built up on the client session. To avoid errors, if session state was not correctly restored, further commands from the application cannot rely on session state that was built up on the client session. The application or components of the application may need to restart to avoid any dependence on prior session state.

In one embodiment, the process includes receiving a first response on the first database session and extracting the first set of results from the first response. The process also includes receiving a second response on the second database session and extracting the second set of results from the second response. The first set of results that is extracted from the first response includes a first subset of results that could have been visible to (i.e. were exposed to or could have been accessed by) the application but not a second subset of results that could not have been visible to the application. The second set of results that is extracted from the second response includes a third subset of results that could have been visible to the application but not a fourth subset of results that could not have been visible to the application. In a particular embodiment, the first subset and the third subset are the same only when client state is preserved, but the second subset and the fourth subset may be different even if client state is preserved. The client state is the information that has been exposed to the application as the application interacts with the database. In other words, the client state is the information that is visible to the application, and the information upon which the application may be making decisions.

In one embodiment, the process includes determining a first value using a procedure by inputting, to the procedure, a first set of application-visible results received on the first database session in response to the set of commands sent on the first database session. The process also includes determining a second value using the procedure by inputting, to the procedure, a second set of application-visible results in response to the set of commands sent on the second database session. The procedure evaluates whether the first set of application-visible results matches the second set of application-visible results. In one embodiment, the process includes determining whether the first value matches the second value, and the process includes causing operation of the application to resume in response to determining that the first value matches the second value. In a particular embodiment, the procedure is a checksum procedure, and the value is a checksum value. In one example, the checksum value is a fixed size or a limited size regardless of a size of the first set of results and a size of the second set of results. In various other embodiments, the procedure may be any procedure that accounts for results from both runtime and replay of the set of commands. In a simple example, the results from runtime and replay may be compared to each other without using any procedures to reduce or limit the amount of data to be compared. In one embodiment, the checksum incorporates all results that were visible to the client. These results includes the rows returned, the row count returned, the error text and error message, function and/or procedure results, and in one embodiment DML returning.

In one embodiment, the process includes determining whether each command satisfies one or more criteria by evaluating each command on a command-by-command basis or searching the set of commands for any commands that actually change the state of the database, any commands that could change the state of the database, any commands that actually start or complete a transaction, or any commands that could start or complete a transaction. As used herein, a transaction includes one or more commands that commit additions, modifications, deletions, or other changes to information stored in the database. In one embodiment, the process includes: storing a particular set of commands that, if executed, could otherwise start or complete a transaction, for example, by committing changes to the database, or storing a particular set of commands that, if executed, could otherwise change the state of the database. In the example, the process may include evaluating each command on a command-by-command basis or searching the set of commands for any commands in the particular set of commands.

The process may include, but need not include, determining whether or not the detected commands actually changed the state of the database, or actually started or completed a transaction. If the set of commands does not include any commands that could change the state of the database, or commands that could start or complete a transaction, then, in one embodiment, the set of commands is acceptable or safe for replay. In one embodiment, a database instance serving a database session may inform the client as to whether any commands of the set of commands made any important changes, such as starting or completing transactions, or otherwise whether the set of commands is acceptable or safe for replay. In response to determining that the set of commands is safe for replay, the process includes causing a delay in operation of the application and replaying the set of commands without the risk of those commands executing twice to change the state of the database, or to start a transaction that was already started.

If the set of commands does include commands that may change the state of the database or may start or complete a transaction, then the process may include avoiding replay and also failing to preserve the state of the database session. Replay may be avoided due to the risk of replaying commands that could execute twice to change the state of the database, or start a transaction that was already started. Executing these types of commands twice could result in errors due to a database session state that is unexpected by the application. Replaying these types of commands could result in duplicate insertions or other unwanted database changes, possibly causing corruption of the data stored in the database.

In one embodiment, the process includes determining whether or not commands in the set of commands satisfy one or more criteria during runtime of the set of commands, before the process detects the unavailability of the first database session. Determining whether or not the commands satisfy the criteria may be performed on each command individually as the command is sent, on a request that includes several commands, or on some other grouping of commands. In one embodiment, an entire set of commands is disqualified upon detecting that a given command in the set of commands is disqualified. In this embodiment, evaluation of commands may stop upon detecting a disqualifying command, and resume after the set of commands is complete. For example, replay may be disabled upon detecting a first disqualifying command in a request of commands, and replay may be re-enabled at the end of the request. In response to determining that the set of commands includes at least one command that satisfies the one or more criteria, the process includes setting a flag that indicates a boundary of a transaction or other disqualifying criteria was detected in the set of commands. In a particular embodiment, the process includes setting a flag when the process detects that a transaction has been started or other disqualifying criteria has been detected in one or more of the commands, and clearing the flag when the process detects the end of the set of commands, detects that a transaction has been completed, or detects other re-qualifying criteria has been detected in one or more other of the commands. By setting the flag when disqualifying criteria is present in a set of commands, the first criteria violation may disable replay for the entire set of commands. Replay continues to be disabled until the flag is cleared.

In one embodiment, the process includes causing a delay in operation of the application, sending the set of commands for execution on a second database session, and causing operation of the application to resume without requiring the application to disregard locks, temporary variables or database objects, user-specific information, application-specific information, cursor information, temporary arrangements or selections of data, and/or the partially completed operations that were already achieved during the first database session.

In one embodiment, commands are replayed on the second database session against states of the database in which the commands were previously executed on the first database session. In another embodiment, commands are replayed on the second database session against current states of the database. In a particular embodiment, a first subset of one or more commands is sent for execution on the second database session at states of the database in which the first set of commands were previously executed on the first database session. The previous states of the database may be identified and recreated using identifiers, such as a System Change Numbers ("SCNs"), that are associated with each command in the first set of commands. In the particular embodiment, a second subset of one or more commands may be executed on the second database session using current states of the database.

In one embodiment, some or all of the processes described herein are performed by one or more devices running a Java Database Connectivity ("JDBC") driver that is logically positioned between the application and the database instances. The JDBC driver exposes an Application Programming Interface ("API"), or set of procedures, to applications. The applications make calls to procedures, using the API, to access the database. The JDBC driver may record conversations between the driver and the application. JDBC conversations include, for example, a name of a procedure called by the application, arguments to the procedure provided by the application, and other information such as results available to the application after the results are retrieved by the driver from the database instance. The techniques described herein are not limited to a JDBC driver. Features described herein may be implemented in any client driver.

FIG. 1 illustrates an example database system that allows an application to access a database in a database session. As shown, application 101 is in communication with driver 102. For example, driver 102 may expose an API to application 101, and application 101 may use the API to make calls to driver 102. At a particular time, driver 102 is in communication with database 104 on database session 103A, as illustrated with the dotted line. Database session 103A provides access to database 104 by allowing application 101 to send commands for execution against database 104. Database session 103A provides results to driver 102, and driver 102 makes the results accessible to application 101. All recorded commands in the history of commands may be purged when a command is found not to be replayable.

During operation, driver 102 may record API calls and arguments to the API calls made by application 101. Driver 102 may also record results received by driver 102 on database session 103A in response to database commands sent by driver 102 on database session 103A. In one embodiment, driver 102 retains, after sending the calls, only if all calls so far satisfy a set of qualifying criteria and/or do not satisfy a set of disqualifying criteria. Driver 102 may purge calls and results when a request associated with the calls ends. Calls and results that are not purged remain accessible to driver 102.

After the particular time, driver 102 detects unavailability of database session 103A. In response, driver 102 elects to restore session state to database session 103B. In one example, driver 102 determines, on a command-by-command basis as each command is received, whether commands in the set of sent commands satisfy one or more criteria. In one embodiment, if any command of the set of sent commands satisfies the one or more disqualifying criteria, then replay is disabled for the entire set of commands, and, to avoid the risk of extremely adverse consequences that could result from one or more of the commands being replayed, no commands from the set of commands are replayed on database session 103B. If no commands in the set of recorded commands satisfy the one or more disqualifying criteria, then the set of commands may safely be replayed on database session 103B, without the risk of extremely adverse consequences that could occur by replaying commands that satisfy the one or more disqualifying criteria.

Operation of application 101 may experience a delay as commands are replayed on database session 103B. Once the commands are replayed, driver 102 may determine whether the application-visible results that were received in response to the commands sent on the second database session are the same as the application-visible results that were received in response to the commands sent on the first database session. If the application-visible results were the same for both occurrences of execution of the commands, then driver 102 may safely presume that the database session 103B is substantively the same as database session 103A just prior to unavailability of first database session 103A. Therefore, operation of application 101 may be resumed, and further commands may be submitted from application 101 to driver 102 for execution on database session 103B. Application 101 need not be aware, or even account for, failover of the database session from database session 103A to database session 103B. Database session 103B could also become unavailable, and session state could be preserved in the same manner as the session is migrated to database session 103C.

Figure 2:
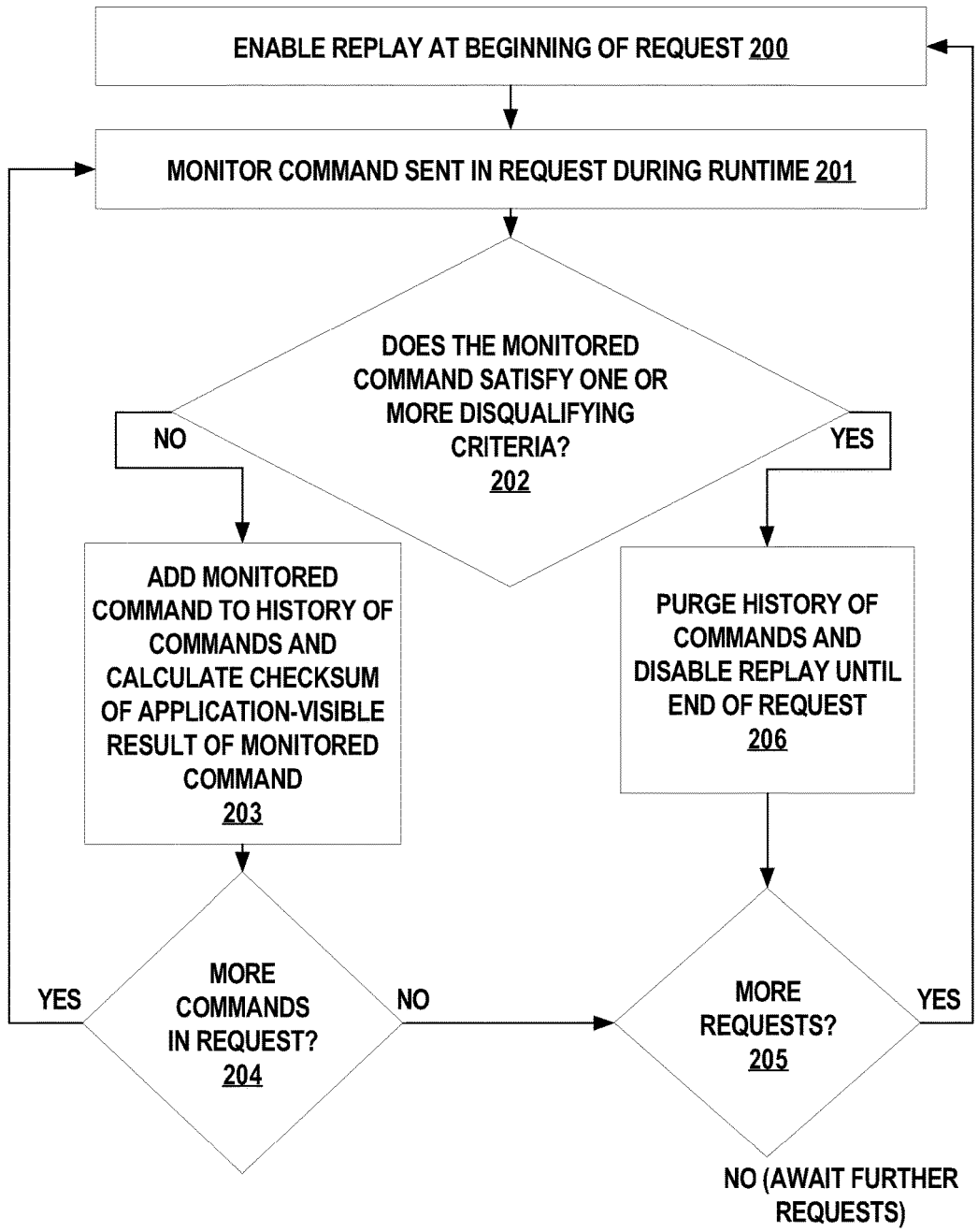
FIG. 2 illustrates an example process for enabling and disabling replay, and maintaining a history of commands for replay.

FIG. 2 illustrates an example process for enabling and disabling replay, and maintaining a history of commands for replay. The process includes detecting the beginning of a request and, in step 200, replay may be enabled at the beginning of the request. In step 201, the process includes, optionally on a command-by-command basis as each command is received, monitoring a command that is sent on a first database session during runtime. In step 202, a determination is made as to whether or not the monitored command satisfies one or more criteria, such as disqualifying criteria. If the monitored command does not satisfy the one or more disqualifying criteria, then, in step 203, the process includes adding the monitored command to a history of commands, and calculating a checksum of an application-visible result of the monitored command. If there are more commands in the request, as determined in step 204, then the process continues at step 201. If there are no more commands in the request, then, if there are any further requests, the process continues at step 200 for the next request. The history of commands may be cleared as requests are completed and changes are committed to the database. If there are no more commands in the request and there are no more requests, then the process may await further requests from the client.

If the monitored command does satisfy disqualifying criteria, as determined in step 202, then, in step 206, the process includes disabling replay and purging the history of commands until the end of the request. Upon the end of the request, if replay was disabled in step 206, then replay may be re-enabled in step 200 for the next request. If there are no other requests, then the process may await further requests from the client.

Figure 3:
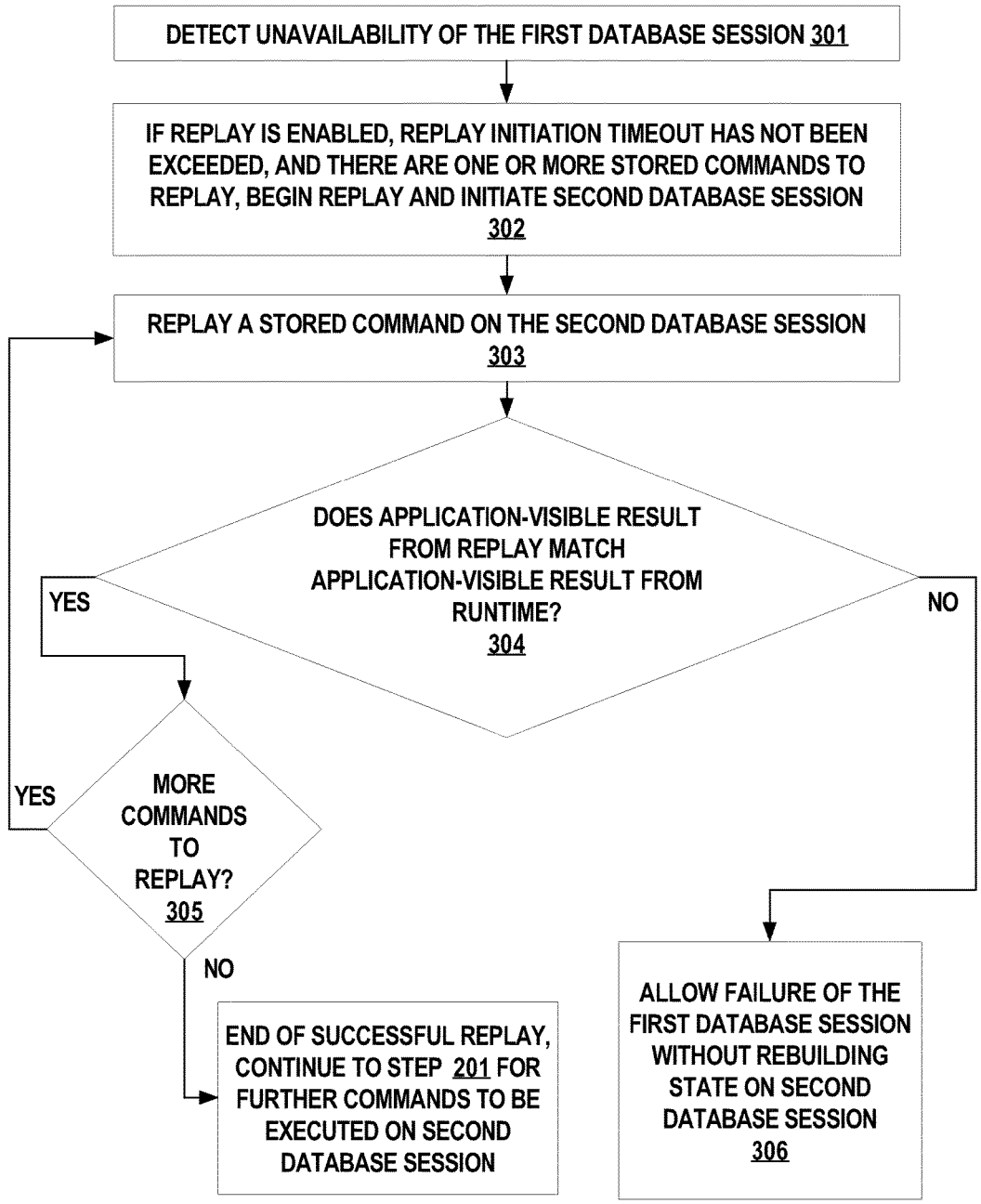
FIG. 3 illustrates an example processes for recovering a stateful database session.

FIG. 3 illustrates an example process for recovering a stateful database session. In step 301, the process includes detecting unavailability of a first database session, for example, while commands are being sent for execution on the first database session during runtime according to the process illustrated in FIG. 2. Having detected an error, the process may include, before initiating replay, confirming that replay is enabled, that the replay expire time has not been expired, and/or that the last command sent is safe to replay. In one example, replay is enabled, and the commands previously sent for execution have been saved in the history of commands. The process also includes, in response to detecting unavailability, if replay is enabled, replay initiation timeout has not been exceeded (e.g., timed out), and there are one or more stored commands to replay, in step 302, begin replay and initiate a second database session on which to send replayed commands. Optionally, commands may be replayed one-by-one, comparing the application-visible results during runtime to the application-visible results during replay after each command is replayed. In one example, when reaching the last call, no results have been received from the server for this call. This call is resubmitted in a recording mode. If it satisfies the criteria for recording this call is recorded and the client continues as per FIG. 2.

In step 303, if commands are replayed one-by-one, a stored command is replayed on the second database session. In step 304, the process includes determining whether the application-visible result from replay matches the application-visible result from runtime. If the results match, then replay was successful for the replayed command. If there are any more commands to replay, as determined in step 305, then the process resumes at step 303. If all commands have been replayed and the results from the replayed commands matched results from corresponding runtime commands, then the client state, or application-visible portion of the first database session state, has been restored on the second database session. If replay is successful, the process may continue in step 202 of FIG. 2 by executing and monitoring further commands on the second database session. In step 306, if the application-visible results do not match, then failure of the first database session is allowed without rebuilding client state on the second database session. For example, the application may crash or otherwise be unable to communicate with the database.

Driver Between Application and Database Instances

In one embodiment, a driver is logically positioned between the application and the database instances. In one embodiment, the driver is configured to carry out monitoring commands initiated by the application and sent on a first database session, determining whether or not commands in the monitored commands satisfy a set of stored criteria, retaining commands for replay based on whether or not the commands satisfy the set of stored criteria, detecting unavailability of a first database session, pausing operation of the application, replaying the retained commands on a second database session, determining whether the client visible results of the commands sent on the first database session match results of commands replayed on the second database session, and/or resuming operation of the application. The driver may be part of the application, part of the database server, part of a mid-tier server that is separate from the application and the database server, or part of some other logic that is separate from the application, the database server, and the mid-tier server. For example, a driver layer may exist on the client side, with access to any or all requests issued by the client against the database. Functionality described as being executed by the driver may also be executed by the application, by the database server, by a mid-tier server that is separate from the application and the database server, or by any other mechanism such as other mechanisms for accessing the database.

In one embodiment, the driver is a Java Database Connectivity ("JDBC") driver. In various other embodiments, the driver may be an Oracle Call Interface ("OCI") driver, an Open Database Connectivity ("ODBC") driver, a C Sharp driver, a Systems Network Architecture ("SNA") driver, or any other specially programmed driver that accomplishes functionality as described herein. JDBC is an API or set of procedures that a higher-level component may call to access the database. JDBC provides connectivity between the Java programming language and a wide range of databases. A JDBC conversation between the application and the driver may include the name of a called procedure, arguments to the called procedure, and other information, such as results received from execution of the called procedure, to determine whether the procedure achieves the same results when replayed. The driver records the JDBC conversation and uses the JDBC conversation to verify that a replay of commands during failover has restored the database session. The driver maintains the history of commands for the duration of the conversation, purging closed calls for completed queries and completed requests. The replay duration is limited by purging closed cursors, and at request boundaries dependent on the nature of the session state.

The driver provides an API that exposes a plurality of procedures to the application. In one embodiment, the API exposes a begin request method and an end request method to the application. A request is a unit of work submitted by an application to execute some functionality. A request has an initialization phase, an execution phase, and an end phase. Requests are demarcated or delimited by the application using the begin request and end request methods. These API calls are embedded when borrowing and returning requests from connection pools. Using the request boundaries, the driver and the server to know where requests begin and end for dedicated sessions, and sessions pooled above the driver pools. For driver connection pools, a begin request is issued at connection check-out and an end request is issued at connection check-in so that the server knows where requests begin and end. They need to be added to frameworks that hold connections for long periods, use these connections for handling requests, and do not return the requests to the lower level pools between requests. A request may use a connection pool or may use a dedicated session for a connection pool, and each get connection adds a begin request marker. Each return to the pool adds an end request marker. If not using a connection pool, requests are also marked using explicit begin request/end request markers.

At failover, to ensure correctness, in one embodiment a brand new session is created. This ensures that the session contains no residual state due to a previous use from a connection pool. An initialization callback is registered on a per-connection basis on the Replay Data Source in the Replay Driver. The initialization callback is executed during the initialization phase when the Replay Data Source gets a new physical connection at replay. Using the callback at replay allows applications to re-establish the connection's starting point after a failover and before replay starts, as was set up at original execution. The initialization actions within the callback are equivalent to or the same as those applied on the original connection. If the callback invocation fails, replay fails on the new connection. In one embodiment, the connection pool is responsible for implementing this driver-level Initialization Callback. As part of the implementation, the connection pool maps the callback method call to the pool-level Initialization APIs such as Connection Labeling Callback or pool-level Initialization Callback, such that connection initialization is equivalent at original execution and replay. If a transaction (top-level or embedded) is opened during the callback invocation (original or at reconnect), the transaction is committed or rolled back before the callback completes. If this is violated, in one embodiment, the Replay Driver throws an exception and does not replay. In one embodiment, a new session is created for replay to ensure that there is no residual state that could otherwise exist in a checked out session.

The execution phase of the request begins once the session is initialized and ends after execution of the last command on the session, as the session is returned to the pool. In one embodiment, a browser checks out a single database session and performs many separate requests for separate users or clients in the database session. In another embodiment, a web request may correspond to a single check-out of a database session from a pool, an execution of commands using the database session, and a check-back-in of the database session to the pool. If the browser manages a single database session to perform many requests, in one embodiment, the browser uses the begin request method and end request method to indicate, to the driver, when a request or when the execution phase of a request begins and ends. The driver receives, according to the exposed application programming interface, marked request boundaries around a set of commands that belong to the request.

In one embodiment, the driver maintains a history of commands and application-visible results for opened requests and purges the history of commands and application-visible results for closed requests. The application that initiated a request does not rely on the session to maintain any information about previously executed commands or previously received results from a prior request. To preserve the expectations for applications that initiate requests, the history of commands and application-visible results is purged between requests. Therefore, purging this client state information between requests does not violate the expectations of applications. At failover, when a prior database session is unavailable, a new database session is created such that there is no residual session state due to using a checked out database session. The client state is rebuilt using the recorded history of commands, and verified using the application-visible results. In one embodiment, cursor information is retained for many requests such that the cursor may continue to be selected across requests.

In one embodiment, cursor information is retained for many requests such that the cursor may continue to be selected across requests. By retaining cursor information, cursors that are used for many requests may be kept. Database sessions may be allowed to retain certain characteristics such that the database sessions are available for particular applications, users, or for particular purposes. In one example, an application requests a customized database session with certain characteristics, and the application is granted an existing customized session that already has the certain characteristics, or an existing session that has been customized to have the certain characteristics. Client state could be partially erased. This allows the driver to keep cursors that span requests. Partial erasing involves keeping open cursors that span requests such that the application may continue selecting from these cursors across requests without losing the potential for client state recovery through replay.

Figure 4:
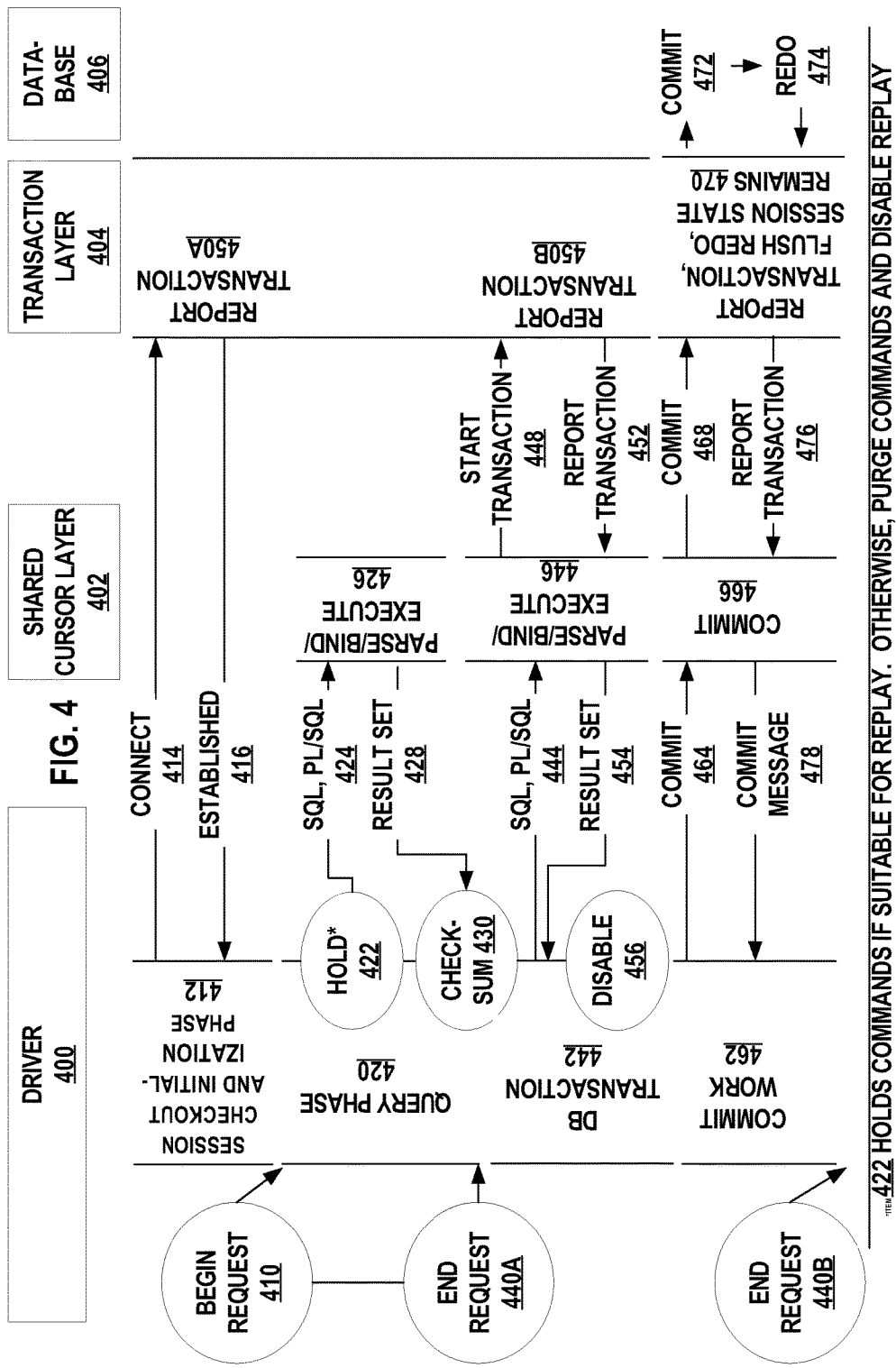
FIG. 4 illustrates an example runtime workflow for a system using a particular driver.

FIG. 4 illustrates an example runtime workflow for a system using a particular driver. In the workflow, a database system is illustrated as driver 400, shared cursor layer 402, transaction layer 404, and database 406. As shown, the workflow begins with the session checkout and initialization phase. In one embodiment, a registered initialization callback is executed during the initialization phase when the Replay Data Source gets a new physical connection at replay. Using the callback at replay allows applications to re-establish the connection's starting point after a failover and before replay starts, as was set up at original execution. The initialization actions within the callback are equivalent to or the same as those applied on the original connection. If the callback invocation fails, replay fails on the new connection.

Once the connection has been initialized, the driver connects 414 the client to a database session, and the driver receives information indicating that the database session is established 416. A transaction may be reported (item 450A) at the transaction layer when the database session is established or thereafter, as shown. The application or the driver may perform further initialization (not depicted) on the database session to prepare the database session for commands to be executed by the application. In one illustrated embodiment, the application may signal the boundaries of a request with begin request 410 and end request 440A. In another illustrated embodiment, the application may signal the boundaries of a request with begin request 410 and end request 440B.

In query phase 420, the driver receives and holds 422 SQL/PL/SQL commands from the client. As shown, the driver holds, at step 422, only those commands that are suitable for replay. In response to detecting a command in a set of commands that is unsuitable for replay, the driver disables replay for an entire set of commands. While replay is disabled, commands may be purged without losing any commands that would have otherwise been replayed in the event the database session becomes unavailable. The commands are sent, as shown in item 424, to shared cursor layer 402 for parsing, binding, and execution 426 against database 406. After execution, a result set 428 is returned to driver 400. As shown, driver 400 computes a checksum 430. Checksum 430 may be stored while the database session remains active. Query phase 420 may repeat, building up a history of held commands and stored checksums that represent results of the commands. In one embodiment, a request is ended 440A at the end of a query phase, with replay in an enabled state.

In another embodiment, a request is ended 440B at the end of a commit work phase, concluding a db transaction phase 442. In database transaction phase 442, Structured Query Language ("SQL") and Procedural Language/Structured Query Language ("PL/SQL") commands 446 are sent by driver 400 for execution 448 against database 406. SQL commands may include arrangements, selections, or modifications of data, variable declarations, function definitions and calls, conditions, loops, exceptions, and arrays. PL/SQL is an extension of the SQL language that supports procedure definitions and calls. Procedures that are defined or called by PL/SQL commands may return multiple values, and may include definitions and/or calls to other procedures or functions. PL/SQL commands often include Data Manipulation Language ("DML") statements to insert, delete, and/or update data in the database or commands to commit data in the database. Driver 400 may not have full information about the possible effects of PL/SQL commands sent to the database server, and so may treat those commands as potentially transactional. If state is built during the committed transaction, that state may not be re-created without the risk of re-executing the transaction. It is also possible to re-create state for a transaction as long as the transaction is not re-committed. In one embodiment, driver 400 treats PL/SQL commands as transactional due to the risk that these commands could be transactional.

In item 448, a transaction is started to execute the commands against database 406. The transaction is reported 450B by transaction layer 404, to shared cursor layer 402 as shown in item 452. A result set 454 is returned to driver 400, and driver 400 disables replay 456 for the commands, unless it receives information from Database 406 that those commands were not transactional. In one embodiment, a determination of replayability is made per request at runtime. The checks performed at the time of replay are whether replay can proceed based on whether or not replay was enabled or disabled at runtime for the current request, based on whether timeout has been exceeded for replay, and/or based on whether the last received command is safe for replay.

In a commit work phase 462, a commit 464 is sent, through shared cursor layer 402 as shown in item 466, to transaction layer 404 as shown in item 468. Transaction layer 404 reports the end of the transaction, flushes redo, and keeps the session state, as shown in item 470. Database 406 commits the work in item 472 and returns redo records in item 474. The end of the transaction is reported by transaction layer 404 in item 476, and to driver 400 in commit message 478. In one embodiment (not depicted), replay is disabled after the commit message is received.

Figure 5:
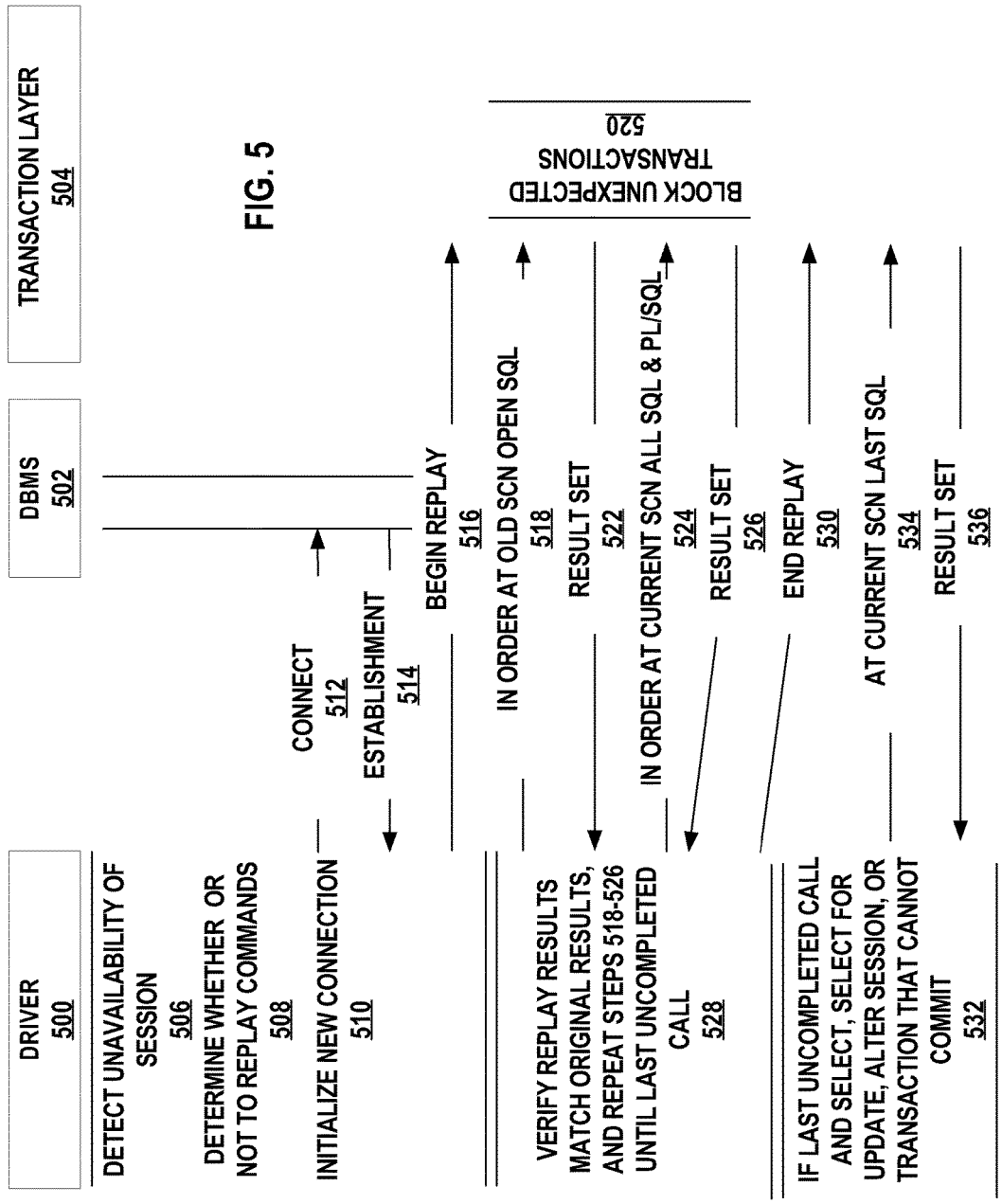
FIG. 5 illustrates an example failover workflow for a system using a particular driver.

FIG. 5 illustrates an example failover workflow for a system using an example driver. As shown, the workflow includes driver 500, database management server ("DBMS") 502, and transaction layer 504. In step 506, driver 500 detects unavailability of a database session. In step 508, a determination is made whether or not replay has been disabled. Determination of replayability may be made per request at runtime, and the checks performed at the time of replay are whether replay can proceed based on whether or not replay is enabled for the current request, whether or not timeout has been exceeded, and based on whether or not the last received command is safe for replay. If replay has not been disabled, a new connection is created in step 510, by connecting (step 512) to DBMS 502 and receiving an indication that a database session has been established (step 514). Further initialization (not depicted) may be performed by the driver or application to prepare the session for execution of the recorded commands. Driver begins replay in step 516. In step 518, open SQL commands are sent in order according to the SCNs in which the commands were originally executed against a now failed or failing database server (not depicted). Transaction layer 504 blocks unexpected transactions in step 520, and result set 522 is returned to driver 500. Then, driver sends, at current SCNs of DBMS 502, all SQL and PL/SQL commands in the order in which they were originally executed against the database server that is now failed, failing, or going down for planned operations. Result set 526 is returned to driver 500. Driver 500 verifies replay results executed against DBMS 502 match original results from execution against the now failed or failing database server for each call passed—any violation disables replay. If any results do not match, in one embodiment, replay stops immediately, and an error is returned as if replay had not occurred. Steps 518-526 may be repeated up to a last uncompleted call, as shown in step 528. Then, replay ends at step 530. If driver 500 determines that replay results do not match original results before all commands have been replayed, then driver 500 may proceed to end replay 530 prior to completion of all commands that were executed against the original database server. If any results do not match, then the database session is not preserved, and failure occurs as normal.

In one embodiment, once driver 500 has reached the last uncompleted call, if the call is select, select for update, alter session, DML, or a transaction that cannot commit, as determined in step 532, the call is replayed at the current SCN in step 534. Result set 536 is returned to driver 500, and operation of the application generating the calls may resume as normal.

Storing Commands Sent During Runtime

The process described herein includes storing commands to be sent or already sent for execution against a database. In one embodiment, command maintenance logic that is positioned between an application and a database instance, or that is part of the application or the database instance, stores commands triggered by the application for execution by the database instance. The command maintenance logic may store any information that allows the commands to be identified and replayed after failure of the database instance. In one embodiment, the command maintenance logic stores a call to a procedure along with arguments that were submitted or otherwise existed for the call. For example, a driver may store a call to an API and arguments submitted for the call such that, upon replay, the driver can use the stored call and arguments to replay the same commands on a new database session. In one embodiment, the command maintenance logic merely selectively holds or retains calls that are already stored as part of a conversation between the application and the driver.

In one embodiment, the command maintenance logic stores commands that were sent after initialization of a database session, excluding commands that were sent to initialize the database session for the application. In this embodiment, the initialization commands do not need to be retained, monitored, or purged. During replay, the driver may rely on the application to initialize a new database session before the monitored commands are replayed on the new database session. In another embodiment, the command maintenance logic stores session initialization information such that the driver can prepare the new database session for replay without relying on the application.

In one embodiment, the command maintenance logic monitors database commands that are sent during runtime, and keeps track of whether or not replay is enabled. Once the driver becomes aware that the database session is unavailable, the command maintenance logic provides the set of stored commands for replay against a new database session. The command maintenance logic need not record commands sent on the new database session prior to completion of replay on the new database session. In one embodiment, replay monitoring logic monitors application-visible results of the commands that were replayed, and verification logic verifies that the results from replay match the results during runtime. Once replay has completed on the new database session, and when the new database session is used in replacement of the previous database session, the command maintenance logic may start monitoring the new database session as if there was no interruption experienced from the unavailability of the previous database session.

In one embodiment, the command maintenance logic stores SCNs. Each SCN identifies a state of the database that existed when the command was created, transmitted, received, executed, or committed, or a state of the database that existed when a response to the command was created, transmitted, received, executed, or committed. For example, an SCN may identify a commit state of the database against which a command was executed. During replay, the recorded SCN may be submitted with the recorded command such that the recorded command may be replayed against the same database state. The command maintenance logic may store any database state information or timing information that allows the commands to be re-executed in the same manner and against the same data for which the calls were originally executed.

In one embodiment, the command maintenance logic keeps the history of commands for the duration of the conversation by the application using the database session. The command maintenance logic may purge closed calls for completed transactions and/or completed requests. The replay duration is limited by purging closed cursors after a transaction has completed, and at request boundaries dependent on the nature of the session state. Also, when state has not been changed after startup, cursors may be purged when they are closed. If state has changed after startup, cursors are not purged when they are closed.

In one embodiment, the command maintenance logic maintains a history of commands relevant to application-visible results from the database instance. For example, the command maintenance logic may maintain a history of calls relevant to SQL, PL/SQL, and ALTER SESSION during a client conversation with the database. During failover, the calls maintained in the history may be replayed in chronological order, according to the SCN or snapshot time recorded for each of the calls. The SCN may or may not be preserved, depending on the type of call. For example, PL/SQL calls may be replayed on second database session using a current SCN, regardless of the SCN that existed when those calls were originally played on a first database session. Therefore, in one embodiment, the SCN is not recorded for PL/SQL calls but may be recorded for other calls. In one embodiment, SCNs cannot go backwards during replay. Once a statement is executed at a current SCN, all further statements execute after the current SCN. In one embodiment, due to the complexity of PL/SQL commands, replay of PL/SQL commands using prior SCNs is not allowed by the driver. In another embodiment, the SCN is not recorded for any calls.

In one embodiment, the command maintenance logic maintains or records only those commands that are not part of a transaction. For example, the command maintenance logic may set a transaction initiation bit upon sending a command that does start or complete a transaction or could start or complete a transaction. For example, when the command maintenance logic detects that a set of commands could modify a state of the database, the command maintenance logic may set the transaction initiation bit. When the user call has completed execution, possibly resulting in a modification to the state of the database, the command maintenance logic clears the transaction bit. The transaction initiated bit is cleared every round trip call, and the transaction initiated bit is set if a call starts a transaction. In one embodiment, the presence of a transaction In one embodiment, information that is not necessary for replay is stripped away from the commands as they are recorded. For example, network-layer information, transport-layer information, and other information that may not affect results of the commands, may be excluded from the commands as they are captured by the command maintenance logic. Similarly, information may be stripped from results of the commands when the information should not be accessible to or able to be later referenced by the application in a database session.

In various embodiments with or without the replay features described herein, the driver may provide an API that allows the application to identify a set of packages and objects for which state should be saved in case the database instance fails. Once specified by the application, packages and objects may be saved by the driver and restored upon failure. The application may specify variables to be saved during runtime, or the application may specify a triggering event, such as a commit or a request boundary, that causes variables to be saved. If state is saved at each commit point, then a rollback will undo any state changes that were performed since the last commit. The application may also specify that state should be saved each time state changes for specified objects. Saving state each time state changes for the object might consume too many resources at runtime and would require a significant amount of management by the application to specify the objects for which state should automatically be saved.

Commands may be purged from the saved history of commands as transactions are completed, or as the application notifies the driver that the command will no longer be used, such as when an instance of the application closes or under other circumstances where an express purge is directed by the application. In one embodiment, commands that remain in the history are only those commands that were performed after the latest completed transaction. In other words, commands at or before the latest completed transaction may be purged from the history of commands to be replayed. In another embodiment, commands are purged when the user closes a browser session with the application. Upon determining that the application session has ended, the application may notify the driver so that the driver may purge commands from the history of commands. In another embodiment, commands are purged upon failure of the application.

Storing Results from Execution of Commands During Runtime

In one embodiment, the command maintenance logic also stores results of recorded commands as the results are received from the database instance during runtime. For example, the command maintenance logic may record selected values, affected row counts, error codes and messages, or outbinds that resulted from execution of one or more commands submitted in the database session during runtime. The recorded results of commands may differ when the commands are executed against different data or different states of the database. Therefore, in one embodiment, same results for two different executions of the same commands would indicate that each execution of the same commands was executed against same data or same states of the database. Further, the same results may indicate that a database session that originally existed between a first database instance and an application has been sufficiently or substantively restored between a second database instance and the application.

In one embodiment, results from execution during replay may or may not be as results received during runtime; however, whether or not the results are the same, the database session state may have been restored or rebuilt so as to be compatible with the client state. In other words, the results during replay may include differences from the results during runtime, so long as the application may continue to execute database commands on the restored database session after the delay, even if the database commands rely on state that would otherwise be lost by the mere creation of a new database session without replay. In one embodiment, if the same application-visible results are received during runtime and replay, the replay is determined to have sufficiently restored the client state. The application may have cached results and has made decisions. When the results visible to the application are the same during replay and runtime, the client state is determined to have been restored to the new database session even if some parameters not visible to the application are different. For example, network-level information passed between the client and server may be different during runtime and replay, but this information is not exposed to the application.

In one embodiment, the command maintenance logic stores only those results that are visible or accessible to the application. The recorded results may include results that are being displayed by the application to a user of the application when a first database instance serving the application fails over to a second database instance. The recorded results may also include results that are capable of being or have already been accessed, modified, selected, or arranged by the application and/or the user of the application. For example, the results may include only those results that are or could be exposed to the application by an API between the command maintenance logic and the application.

In one embodiment, information may be stripped away from the results as they are recorded. For example, the command maintenance logic may exclude network-layer information, transport-layer information, and other information that depends on factors other than the state of the database and/or the data stored in the database. By excluding this other information, the command maintenance logic can ensure that captured results include only those results that are to be checked for consistency as the commands are replayed as long as the commands are replayed against same data and/or same states of the database.

In various examples, commands may be sent on the database session but not executed by a database instance prior to unavailability of the database session; commands may be sent on the database session and executed by a database instance but not returned to the application prior to unavailability of the database session; or commands may be sent, executed, and returned to the application prior to unavailability of the database session. In one embodiment, the command maintenance logic stores information that indicates whether a command was sent and not returned or sent, executed, and returned to the application. The command maintenance logic may or may not be aware of whether a given command was received or executed by a database instance prior to unavailability of the database session.

In one embodiment, results have been received and recorded from all commands sent to the database, possibly excepting the most recent one command, when determining whether to proceed with replay. In another embodiment, results are known for all commands sent, optionally excepting (a) one or more of those commands for which execution could not have resulted in committing a top-level transaction if any.

In one embodiment, replay should be disabled if any of the commands for which results have not been received may have committed. Generally, if N+1 commands have been submitted, and if commands N are known to be not committed, replay should be disabled if command N+1 may have committed, whether or not a result is known for command N+1. In one embodiment, several commands are submitted on the database session without waiting for responses. In this embodiment, each command is evaluated to determine whether (a) the command got results back and did not commit, or (b) even if no results were received, the command could or could not have committed. If the command could not have committed even if no results were received, the command may be determined to be acceptable or safe for recording and replay.

Determining Whether Commands are Acceptable for Replay

In one embodiment, command evaluation logic determines whether or not commands sent during runtime are acceptable or safe for replay based on whether or not the commands satisfy certain criteria. The determination of whether or not commands are acceptable or safe for replay is made before the commands, which were initially sent on a first database session, are replayed on a second database session. In order to determine whether or not the commands satisfy the criteria, the command evaluation logic, which may be implemented between the application and database instance, as part of the application, or as part of the database instance, may access a stored set of criteria and determine whether or not commands from the set of commands satisfy any criteria from the set of criteria. The determination may be made on a command-by-command basis, or on a set of commands, such as commands that were submitted within the same request boundaries. The criteria may be hard-coded into the command evaluation logic, or configurable using an interface provided to a user or administrator of the database system. For example, an application developer, mid-tier server developer, or database server developer may add or remove criteria from the set of criteria when developing integrated software with unique dependencies on database commands. In one embodiment, the criteria are defined such that, if commands are allowed to replay, the commands are expected to produce the same the client visible results. In this embodiment, replay of each command may be verified to check whether the command produced the same client visible results. If the command produced the same client visible results, then replay may progress. In yet another embodiment, commit initiates purging of earlier history. In this embodiment, at commit, the last transaction is purged and client cursors that span transactions remain.

If command evaluation logic on a database instance determines whether or not commands from the set of commands satisfy criteria, the command evaluation logic may store an indication in shared memory or other shared storage that is accessible to the driver or to the application in the event that the database session becomes unavailable. In this embodiment, the driver may determine whether or not the set of commands satisfies the criteria by accessing the indication stored by the database instance.

In one embodiment, whether or not a set of commands satisfy the criteria is based on whether or not the set of commands is transactional. A set of commands is transactional if one or more of the commands, when executed, can change the state of the database such that replay of the set of commands, without knowing whether the state of the database was actually changed, would run the risk of changing the state of the database to an unpredictable state. Session state information may include any information that can be accessed or referenced by the application during a database session, even if that information is not permanently stored in the database and/or is not otherwise available to other applications or users on other database sessions. Non-transactional session state information is information includes state that is built up by commands that cannot commit changes to the database or otherwise modify the state of the database to an unpredictable state if replayed. For example, locks that were obtained for the previous database session, variables that were declared for the previous database session, and other non-transactional session state information built up during the previous database session may be preserved by replay. On the other hand, transactional session state information, including state that is built up by commands that may commit changes to the database or otherwise modify the state of the database to an unpredictable state if replayed, is not preserved, and the existence of transactional session state information in a database session causes replay to be disabled for the database session.

Various approaches to defining the criteria may be used depending on varying risks of undesirable side-effects, balanced with the desirability of preserving session state and the cost of identifying commands that are safe to replay. More conservative approaches may be used when the importance of data integrity and the development and/or runtime cost of identifying commands that are safe to replay highly outweigh the undesirability of losing session state when a session fails. Conservative approaches correctly rebuild the database session and avoid logical corruption. Correctness is determined by a strong set of rules. Weak rules and custom configuration are excluded when they can lead to logical corruption.

A looser approach may be used when the application development team can sustain the cost of identifying additional commands that are safe to replay regardless of the matching criteria that is specified generically with respect to applications. A loose approach is expensive because it requires customized identification of commands. One approach is used when the undesirability of losing session state when a session fails outweighs the importance of data integrity and the development and/or runtime cost of identifying commands that are safe to replay. In many implementations, data integrity is a primary concern, even though a variety of approaches are described herein.

In one embodiment, the command evaluation logic keeps track of whether a current history of commands is safe for replay asynchronously with detection of whether or not the database session on which the commands were processed is available. The command evaluation logic may determine whether the command satisfies criteria before, during, or after the command is sent for execution on the original database session and before, during, or after unavailability of the original database session. For example, the command evaluation logic may determine whether commands are safe for replay as the commands are received from the application during runtime. The driver may disable replay for a set of commands if any commands from the set of commands satisfy or do not satisfy a set of criteria. If any single command from a set of commands is unsafe to replay, then replay of the set of commands should be disabled to avoid replay of the single command. For example, replay may be disabled for a set of commands if one of the commands in the set starts a transaction. If the current history of commands would include commands that disable replay, these commands and other commands in the history may be purged so that the history of commands only retains commands when replay of the commands would be enabled. Keeping the history of commands free of any commands when replay is disabled frees up memory. Replay may be re-enabled when the driver detects one or more other commands that satisfy criteria for re-enabling replay. When replay is re-enabled, the command evaluation logic may resume retaining commands in the history of commands.

In a particular example, replay is disabled when the driver sends a command that starts or completes a transaction or could start or complete a transaction in the database session. While replay is disabled, the driver may purge commands from the history of commands until the driver sends a command that ends the actual or potential transaction. Upon sending the command that ends the actual or potential transaction, the driver may re-enable replay and resume retention of the history of commands to be replayed.

In another embodiment, the command evaluation logic determines whether the current history of commands is safe for replay after detecting that the database session on which the commands were sent has become unavailable. In one example, the command evaluation logic determines whether the current history of commands is safe for replay in response to detecting the unavailability. In another example, the command evaluation logic determines whether the current history of commands is safe for replay in response to newly receiving a command to be sent for execution after detecting the unavailability of the database session.

In one embodiment, the command evaluation logic, such as logic in the client driver, avoids replay of the commands if any of the commands satisfy the set of criteria. In another embodiment, the command evaluation logic avoids replay of the commands only if all of the commands satisfy the set of criteria. In these embodiments, the criteria may define characteristics of commands that are not desirable for replay. For example, the criteria may define characteristics of commands that would create different states of the database if executed twice rather than once. As another example, the criteria may define characteristics of commands that would cause an error at one or more levels of the database system if executed twice rather than once. In one example, the criteria may identify commands that, when executed, add, delete, or modify data stored in the database or start or complete a transaction. Replay may also be avoided, based on the criteria, if the commands include a distributed transaction, or if the commands are dependent on environment variables such as timing, etc., that are unlikely to be preserved during replay.

In yet another embodiment, the command evaluation logic causes replay of the commands if any of the commands satisfy the set of criteria. In another embodiment, the command evaluation logic causes replay of the commands only if all of the commands satisfy the set of criteria. In these embodiments, the criteria may define characteristics of commands that are safe for replay. For example, the criteria may define characteristics of commands that do not change the state of the database, whether or not the commands are executed twice. As another example, the criteria may define characteristics of commands that would not cause an error if executed twice rather than once. In one example, the criteria may identify commands that, when executed, select or arrange data stored in the database without the possibility of committing changes to the database.

In one embodiment, commands may be identified based on the names of the commands or the names of calls to the commands. For example, a "SELECT" command may be identified as a command that selects or arranges data but does not affect the state of the database. As another example, and "UPDATE" command may be identified as a command that, if committed by a "COMMIT" command, changes or could change the state of the database.

Correctness of a command for replay may be determined in the client driver by a default set of rules. In one embodiment, additional or alternative rules may be defined on an application-specific basis. In another embodiment, the rules are generic with respect to the application, and the rules do not require updating or modifying the application. In this embodiment, commands may be checked on a command-by-command basis in a manner transparent to the application.

In another embodiment, commands may be identified based on information passed with the commands or mapped to the commands. However, passing additional information with the commands may involve re-configuration of the application to pass the additional information, and this is a major development and certification cost. That said, in one example, a command may be passed with a variable that indicates whether or not the command is safe for replay. In another example, a listing of safe and unsafe commands is configured on the driver to avoid making any development changes to the application. The command may be mapped to a value that indicates whether or not the command is safe for replay. In a particular example, the mapping is created by a user, administrator, or developer, based on the effects of the commands on the database. Commands that are safe for replay are stored in association with information that indicates those commands are safe, and commands that are unsafe for replay are stored in association with information that indicates those commands are unsafe.

In one embodiment, the command evaluation logic uses the criteria to exclude some commands that could be safe for replay in order to avoid the risk of including any commands that are unsafe for replay. For example, commands may be excluded from replay if the commands could potentially start or complete a transaction, without determining whether or not the commands actually started or completed a transaction in any given execution of the commands. Defining the criteria in this manner may allow the command evaluation logic to make quicker determinations of whether or not a received command is safe to replay. On the other hand, excluding commands that could be safe for replay could prevent the database system from taking full advantage of the replay functionality. In one embodiment, replay is allowed to complete, thereby rebuilding the client state on a new session, only when the replay safely re-establishes the same client visible results. As commands from a request are replayed, optionally on a command-by-command basis, replay logic reexecutes the request as the request was defined in the application.

In one embodiment, the command evaluation logic causes replay of the commands on a second database session only if the command evaluation logic has received confirmation that all of the commands that were executed on the first database session during runtime and returned state. In other words, the command evaluation logic may prevent replay and allow the session state to be lost whenever the commands include at least one command for which execution on the first database session cannot be confirmed.

In another embodiment, the command evaluation logic causes replay of commands on the second database session even if the replay logic has not received confirmation that all of the commands were executed on the first database session during runtime. The command evaluation logic may allow certain commands but not others to be replayed to the second database instance even if those commands have already been executed against the database. The command evaluation logic may use the criteria to determine which commands are safe to replay even though these commands may execute twice against the database.

In one embodiment, the command evaluation logic determines whether commands are safe to replay based at least in part on a transaction state associated with a request. The transaction state associated with the request shows that the request is transactional if the request leaves a transaction open after execution of a set of commands in the request. Looking at the transaction state associated with the request may be insufficient to detect that the PL/SQL execution issued transactions and committed the work before returning to the user. Therefore, even if the transaction state of the request is cleared, a transaction may have been opened and closed within the request. Replaying commands from the request has the unacceptable risk of creating duplicate transactions if any of the commands could start or complete a transaction. For example, replaying PL/SQL commands could start or complete a transaction at replay by following a different code path than was followed when the transaction was started during runtime. As another example, replaying a command to insert a row could insert a duplicate row if the command was played during both runtime and replay.

In one embodiment, an indicator, called a TRANSACTION_INITIATED_BIT, is computed per call roundtrip on the database session. The call roundtrip includes one or more commands sent on the database session, and a possible response to the one or more commands by a database instance to indicate that the one or more commands were processed and possibly initiated a transaction. The response may include a set of results from processing the one or more commands. The transaction initiated bit indicates whether the set of commands defined by the request includes any commands that could start or complete a transaction.

In one embodiment, the transaction initiated bit is set in all cases where a transaction started except when the request only includes autonomous transactions and recursive transactions. For example, the transaction initiated bit may be set for local transactions, anonymous blocks with a transaction, remote or distributed transactions, auto-commit with a transaction, remote procedure calls with a transaction, Data Definition Language ("DDL") commands, DDL commands via DBMS_SQL, transactions embedded in PL/SQL, remote or distributed transactions started from PL/SQL, transactions embedded in server-side Java, or remote or distributed transactions in server-side Java.

Various embodiments will differ on which commands are worth the risk to replay and which commands are not worth the risk to replay. In one example, commands to send files, write PL/SQL output, send notifications, and make web requests may be replayed in addition to commands that select, arrange, or perform some other operation on data without committing a modification to the database. Therefore, in one embodiment, the transaction initiated bit is not set for commands to send files, write PL/SQL output, send notifications, make web requests, select data, arrange data, perform other operations without committing a modification to the database, and/or for any other autonomous transaction.

In one example, a call is identified as transactional when that call includes executing any of the following commands: an insert command, an update command, a delete command, or a select for update command or a DDL or DCL command or a procedure or function that embodies any of these commands. The transaction initiated bit may be set for the request even if the request includes other commands that, on their own, would not have qualified as transactional. In one embodiment, if a call is transactional, the call is not replayed, and replay is disabled for this request. The transaction initiated bit may be set even if a call both starts and commits in one or more transactions. The transaction initiated bit indicates an intention to start a transaction in any call, and the transaction initiated bit may be updated at each new call. The transaction initiated bit may be cleared when the call is completed or when the request is completed.

The driver may use the transaction initiation bit to keep track of whether replay is safe for a current call. The transaction initiation bit is set when the call includes any command that started a transaction, and the transaction initiation bit is cleared when the call is completed or when the request is completed. The transaction initiation bit may be maintained by the driver in a manner that is transparent to the application, and the transaction initiation bit may or may not be exposed to the application. In one embodiment, if the last submitted commands either returned with a transaction initiation bit cleared or were SELECT-type of statements for a conversation where the transaction bit is not needed, the driver may safely replay commands without the risk of starting a transaction.

The transaction initiated bit is used because a call may both start and commit one or more transactions. The transaction initiated bit indicates an intention to start a transaction in any call. It is cleared for each new call. In one embodiment transactions are not replayed. Replay is disabled and a history of commands is purged as soon as the transaction-initiated bit is seen on return from a call as it is unsafe to replay.

Detecting Unavailability of Database Session

In one embodiment, monitoring logic receives information that indicates a database session has become unavailable to the application. For example, the information may indicate that the database instance has failed or is about to fail, or a service or other resource provided to the application by the database instance has failed or is about to fail. The unavailability of the database session could result from a planned or unplanned outage. For planned outages, the information received by the monitoring logic indicates that an outage is planned even though the database session may still be available. Indicating a planned "down" or outage allows work to be completed before failing over and recovering the session. Indeed, when using a connection pool, if all work completed, there is no need to recover the session because the application request has completed. Conversely, if using a dedicated session, the replay will move the session to another instance, allowing for the planned outage. In one embodiment, a database instance may be made unavailable to one service but not to another service, in order to reduce a load on instances in the database system. The monitoring logic may receive information from any agent or component that keeps track of the availability of the original database session. The monitoring logic may respond to the information by closing the database session (for example, a session served by an unavailable database instance), opening a new database session (for example, a session served by a new database instance), and causing replay of commands, which were previously sent on the now unavailable database session, on the new database session. When used to "shed" work in this manner, the replay will be at a less loaded database instance.

In one embodiment, the monitoring logic checks for whether or not the database session is available each time the application submits commands for execution on the database session. Therefore, detection of whether or not the database session has become unavailable may be performed synchronously with receipt of a command to be executed on the database session. This technique may be available if the socket is closed. If the node or network fails, an error is not received until after TCP/IP keepalive expires.

In one embodiment, an efficient technique for monitoring receives a Fast Application Notification ("FAN") events asynchronously with commands. The FAN event comes in, eliminating both wasted code path checking whether the session is available, and eliminates the need to wait on TCP keepalive.

The FAN monitoring logic subscribes to a service that publishes availability information to subscribers. For example, the monitoring logic may receive updated information in Fast Application Notification ("FAN") events. With fast notification of changes through which a number of events are published for system state changes, applications can quickly recover and sessions can quickly be rebalanced. When a resource associated with a service experiences a change in status, such as a termination or a start/restart, a notification event is immediately published for use by various subscribers to the event. For example, a notification event is issued when a database instance becomes available or unavailable, or when a service becomes available or unavailable on an instance. Notification events contain information to enable subscribers to identify, based on matching a session signature, the particular sessions that are affected by the change in status, and to respond accordingly. This allows sessions to be quickly aborted and ongoing processing to be quickly terminated when a resource fails, and allows fast rebalancing of work when a resource is restarted.

The notification events occur for status changes for services and for the resources that support the services, such as a particular instance, an instance, a node or a database cluster. When a service offered by one or more instances starts, a notification event (UP) is issued that may be used to start applications that are dependent on the service. When the service offered by one or more instances terminates, and also when an instance, node, or network terminates, a notification event (DOWN) is issued to halt the dependent applications. When managing clusterware can no longer manage the service because the service has exceeded its failure threshold, a notification event (NOT_RESTARTING) is issued to interrupt applications retrying the service. In one embodiment, the NOT_RESTARTING event initiates switching to a disaster service.

Upon connecting to the cluster, a unique signature (i.e., a locator) is generated for an associated session and recorded on a handle as part of the connection. In an embodiment, the signature comprises a service identifier, a node identifier, and database unique name, and an instance identifier, each of which is associated with the session. In the context of a database cluster, notification events contain information to enable subscribers to identify the particular sessions that are affected by the change in status, i.e., the signatures of the affected sessions. For some types of events, information used to identify affected sessions includes identification of the service and the database associated with the status change. For other types of events, the information used to identify affected sessions additionally includes identification of the instance and node associated with the status change. The affected sessions are the sessions with signatures that match the signature included in the event payload.

There are different times when replay can start after the detection. The monitoring logic may receive information from the FAN events, clear the dead sessions, but not immediately initiate replay. For example, upon receiving a command to execute on a known-to-be unavailable session, the driver establishes a new session on which to rebuild client state that existed for the previous, unavailable session. In another embodiment, the driver may start replay in response to detecting unavailability.

In one embodiment, the monitoring logic triggers replay on an available database session in response to receiving a command to be executed on a database session that has already become unavailable. In this embodiment, the monitoring logic may detect that the database session has become unavailable without restoring the database session. For example, replay is unnecessary if no further commands are executed in the database session after the database session has become unavailable. In one embodiment, the monitoring logic knows that the session is unavailable by FAN or a received error. Replay is invoked if there is a command in-flight or, if there is a command not in flight, replay is invoked when the application next sends a command. If the application never sends a command, replay does not occur.

In another embodiment, the replay logic triggers replay on an available database session before receiving a command to be executed on a database session that is unavailable. In this manner, the database session may be restored before the application submits any other commands on the database session. Upon receiving another command to be executed on the database session, the monitoring logic may have already caused replay to be started or completed to restore the database session. Thus, the newly received command may be executed more efficiently if the database session has already been restored or is partially restored.

Replaying Commands

In one embodiment, replay is disabled by the driver based on whether or not the commands satisfy one or more criteria. For example, replay may be disabled if any commands satisfy disqualifying criteria, or, alternately, if not all of the commands satisfy qualifying criteria. For example, replay may be disabled if there are any transactional commands in the set of commands. In another embodiment, replay of a set of commands may be disabled by the driver if a threshold amount of time has passed since the commands were originally played on the now unavailable database session. In yet another embodiment, replay is not executed (i.e., is avoided) if an outage of the original database session is due to an error caused by the commands submitted by the application. When a non-recoverable error occurs, at call level, the error and call are recorded in the history. Replay replays the same error to produce the same client visible results. For example, an error caused by an application may be discovered when a particular error code is received in response to commands submitted by the application. In another embodiment, replay may be explicitly disabled by instructions passed from the user or application to the driver. In other words, an enabled replay state set by the driver may be temporarily or permanently overridden by an application. Providing an option for the application to explicitly disable replay may be useful when the application or user is aware that replay would be undesirable for a set of commands even though it may not be apparent to the driver. When a non-recoverable error occurs, at call level, the call is saved to the history and the error code and error text are indicated in the checksum as they are a part of the client visible results. To succeed, replay must replay the same error for the same call, rebuilding the same client visible results.

If replay is not avoided, then replay logic proceeds to replay commands on a newly established database session, thereby restoring the session state that existed in the previous database session. In one embodiment, replay of the recorded commands in a new database session causes preservation of non-transactional database session state. For example, locks that were obtained for the previous database session, variables that were declared for the previous database session, and other session state information built up during the previous database session is preserved as the previous database session is replaced by a new database session.

To replay commands on a second database session, the replay logic first establishes the second database session with an available database instance and replaces the previous database session with the second database session. In one embodiment, a logical connection object that is held for the application is remapped, directly or indirectly, from an unavailable database instance to an available database instance. Upon replacement, connection pool logic is notified by the replay logic that the logical connection has been changed, and, in response, the connection pool logic changes stored state information about the logical connection.

In one embodiment, the second database session is known, by the replay logic, to be available to the application. The techniques described herein are not limited to any particular technique for selecting a second database session on which commands are to be replayed. The selection of the second database session may be arbitrary or according to a set of performance-based and/or load-based rules.

In one embodiment, replay is never attempted if the application never makes a call to the replay logic after the first database session becomes unavailable. Whether or not the first database session is unavailable, there may be no need to re-establish the database session if there are no further commands that require execution on the database session. Therefore, in one embodiment, replay may be performed on an as-needed basis, when the driver has received a command for execution and the database session on which the command would otherwise be sent has become unavailable.

In another embodiment, replay starts before receiving further commands from the application. Replay may start early so that the replay is already completed or partially completed before another call is received from the application. In a particular embodiment, replay may be started early for applications that show a pattern of frequently executing commands on database session, and on an as-needed basis for applications that do not show a pattern of frequently executing commands on database sessions. The pattern may be based on a frequency in which the application sends commands for execution within a specified period of time. In other words, the driver may be configured with logic that tracks and adapts to patterns of access by applications. The driver may keep a database session available, by replaying early when database sessions fail, for applications that show patterns of frequent access or sets of consecutive requests.

During replay, the calls maintained in the history may be replayed in chronological order, optionally according to SCNs recorded for the calls. Replay of the commands in chronological order on a new database session rebuilds the session state that existed in the original database session and could have been exposed to the application. Rebuilding the session state in this manner ensures that execution of later commands reference the same objects, variables, or values that would have been referenced had the original database session not become unavailable.

An SCN identifies a state of the database in which a call was initially made and/or executed. The SCN may or may not be preserved, depending on the type of call, during replay. For example, certain procedures, such as PL/SQL procedures, may be replayed at current SCNs regardless of the SCNs in which the procedures were originally called. In another embodiment, the chronological order of the commands is not strictly preserved. The session state may be preserved even by executing out-of-order commands during replay, as long as the out-of-order commands would produce the same results as the original commands as executed during runtime. In one embodiment, out-of-order replay is allowed only if a cursor was submitted at an earlier SCN, is still open, and is being accessed. In this embodiment, no other out of order is allowed because going backwards and forwards in command-order may lead to data corruption. The consistency of the results may be checked after replay to ensure that the execution of the replayed commands caused the same results as execution of the runtime commands.

In one embodiment, for a command to be replayed on a second database session at the original SCN in which the command was played on the original database session, the replay logic sets the SCN for the command and replays the call at the original SCN. For example, select statements may be replayed on the second database session at SCNs recorded by the command maintenance logic that reflect states of the database when the select statements were originally executed on the first database session. In yet another embodiment, a first command is replayed at the same SCN in which the command was executed during runtime, and later commands are replayed sequentially after the first command, with naturally increasing replay SCNs, ordered by the SCNs in which the calls were originally executed on the first database session. For commands to be replayed on the second database session at the current SCN, the replay logic replays the command without setting the SCN. As an example, PL/SQL commands may be replayed at current SCNs. In one embodiment, once replay has begun at the current SCNs, replay continues at the current SCNs until all commands have been replayed on the second database session.

In one embodiment, the replay logic re-executes only those commands that are relevant to the application visible results from the database server. For example, the history of SQL and PL/SQL calls may be recorded and replayed. The replayed commands may have originally produced results that are capable of being or have already been accessed, modified, selected, or arranged by the application and/or the user of the application. For example, the commands may have produced results that are or could be exposed to the application by an API between the driver and the application.

In one embodiment, commands may be replayed on the second database session even if results of the commands have not been received from the failed or failing database instance. If the commands for which results have not been received are the type of commands that could not change the state of the database and/or could start or complete a transaction, then the commands may be replayed against the second database session without the risk of creating a duplicate transaction, creating a duplicate object in the database, or referencing a deleted object in the database.

In one embodiment, to avoid the risk of submitting a commit operation twice, PL/SQL commands are not replayed if results were not received on the unavailable database session prior to the database session becoming unavailable. On the other hand, if results were received from the PL/SQL commands, then the PL/SQL commands may safely be replayed. In one embodiment, select operations and other operations (such as update, insert, or delete) without auto-commit may be replayed even if results were not received, because there is no risk that the select or other operation permanently changed the state of the database.

In one embodiment, the replay logic replays commands that have been performed since a last commit operation was executed against the database. In one embodiment, the commands include commands that do not start or complete a transaction and/or change the state of the database.

Replaying commands against the second database instance allows recovery of non-transactional session state ("NTSS"). NTSS is state of a database session that exists outside the transaction and that is not protected by redo. NTSS can be created through declarative or procedural calls initiated by the client drivers or from triggers within the server. Examples of declarative mechanisms to create such states are attribute settings for MODULE, ACTION, OPTIMIZER_PLAN, NLS settings, date formats, time zone, and so on. Examples of procedural mechanisms that can set NTSS include ALTER SESSION, PL/SQL procedures that populate global variables, LOB processing, AQ processing, and cursors, for example.

Because NTSS is unprotected by redo, NTSS does not survive failures using prior techniques. Chronological replay of commands from a known, good starting position, rather than Transparent Session Migration (TSM), allows the database system to restore NTSS for failed sessions. TSM is also not suitable for recovering from unplanned outages, as TSM uses a point in time capture while the system is available and has no roll forward capability.

Transparent Application Failover (TAF) also fails to provide the benefits of this solution. TAF is unable to handle applications that rely on any state that changes after the initial session setup. Using TAF, if a session fails over to another instance, states for PL/SQL packages and Java in the database are lost after failover. Unlike the techniques described herein, TAF cannot fail over any use of global variables or global cursors or global objects created by the package state. TAF also cannot fail over ALTER SESSION statements that change the environment after initial setup.

As described herein, the driver re-establishes the database session state by re-executing the same operations on the second database session as were executed on the unavailable database session prior to the unavailable session becoming unavailable. If the data returned on the second database session matches the data that was returned on the unavailable database session, optionally as indicated by checksums on the data, then the application may safely resume the second database session, using the same temporary variables and objects that were previously referenced in the now unavailable database session.

With the session state preserved, the application can reliably continue to execute commands that build on the session state in an environment where the session state has been effectively checked for consistency. The replay of commands that is used to re-establish this database state may be transparent to the user, taking place without requiring knowledge by the user or input from the user. In one embodiment, although the replay consumes time, the replay has no other effect on the application or user. In one embodiment, after replay has completed, the application may submit further commands on the second database session that are dependent on the session state information that existed for the first database session and was restored by replaying commands on the second database session.

Verifying that Results of Replay Match Original Results

In one embodiment, result verification logic ensures that the results of replaying the commands on a second database session match results of executing the commands on the first database session during runtime. In one embodiment, the result verification logic verifies that the results of replay match the original results by comparing only the application visible results, or results that could be exposed to the application through the API used to send commands on the database sessions. Application visible results may include values retrieved from the database, error ID numbers, error messages, error text, rowset information, the number of rows returned, the ordering of rows, function output of the procedure, or any other information that is exposed to the application by the API. The application visible results might exclude network-level or transport-level information that frames the application-level information. For example, the application visible results might exclude packet serial numbers, which are likely to differ for information transmitted to and from different database instances.

In one embodiment, the result verification logic computes a checksum based on each result, on a per call basis, received on the first database session during runtime, and each result from replay on the second database session. Instead of comparing portions of the results to each other, or comparing the results to each other bit-by-bit, the result verification logic may compare the checksums in order to determine whether the results match. In one embodiment, the result verification logic uses a Cyclic Redundancy Check ("CRC") checksum, such as a 64-bit CRC checksum per call and accumulates across calls, so that chance matches between the checksums are extremely unlikely when the underlying results do not match. In another embodiment, the checksum is a Secure Hash Algorithm ("SHA") checksum. The checksum may or may not be a cryptographic checksum, and, in one embodiment, it is sufficient that the checksum create a strong likelihood (rather than a certainty) that one set of results matches another set of results when the checksum for the one set matches the checksum for the other set. For any one cursor, there can be either a checksum per fetch, or an accumulated checksum that is built up across all fetches for that cursor. The checksum per fetch finds mismatches at replay early at the cost of a little more memory to hold these checksums in the history.

In one embodiment, the checksums for the first results are created during normal runtime at history collection. The result verification logic discards the results once the checksum for each result has been computed. At replay, the checksums are recomputed. The result verification logic compares the checksums. If the original and replayed checksums mismatch, the replay is rejected and an error is returned to the client.

In one embodiment, for any one call, there can be a checksum created per fetch for that call or a checksum aggregated across all fetches for that call. A checksum recorded per fetch may find a mismatch early if the call is mismatched when replaying. This is at the cost of saving checksums per call in the runtime history.

In one embodiment, each checksum is used as a seed for computing the next check sum. In this way there is a higher quality check that the client visible results for the request are the same.

Causing Operation of Application to Resume with Preserved State

As replay replays each command on the second database session, checksums are compared for each command that completes. Once the result verification logic has verified that the results during replay match the results during runtime, the replay logic may return control to the application to use the database session with session state preserved. Once the application begins executing new commands against the restored session, the new commands are added to a history of commands in case further replay is needed. The application may execute further commands on the database session as normal, as if no failure had ever occurred. In particular, these further commands may depend on session state that was recovered when the replayed commands were replayed on the second database session. These further commands may access or modify information that would have been lost from the database session in the absence of replaying the replayed commands. In one embodiment, these further commands are responsive to user input against information that is displayed to the user, and execution of these further commands depends on the session state that was preserved by replaying the replayed commands. At replay, the driver replays each command checksums are compared for each command. If each checksum matches, then replay continues until completion. Once replay completes, the continued conversation is added to the history for that request.

In one embodiment, before returning control to the application, the replay logic plays one or more commands on the second database session that were never executed against the now unavailable database session. For example, these commands may be commands that were received after the now unavailable database session became unavailable, but before operation of the application was delayed for replay. In one embodiment, operation of the application was delayed for replay, and replay was triggered in response to these commands, and these commands are sent for execution on the second database session after state has been restored to the second database session. These commands are accumulated in the history so that if the second session also fails, replay will execute from the beginning of the request on a third or fourth session, and so on. In one embodiment, this history accumulates until the request ends or replay is disabled.

For example, the driver may receive a "begin request" command followed by a first set of one or more commands, a second set of one or more commands, and a third set of one or more commands. Until the driver receives the corresponding "end request" command, the driver may store the first set of commands and a first set of application-visible results, the second set of commands and a second set of application-visible results, and the third set of commands and a third set of application visible results. Before receiving the "end request" command, replay may be accomplished one or more times to rebuild client state after the driver has received just the first set of one or more commands, after the driver has received the first and second set of commands, or after the driver has received all three sets of commands. When the driver receives the "end request" command, the driver may clear the history of commands to prepare for recording a history the next request.

In practice, many web requests, or commands sent between browsers and database instances, may be read-only. Frequently, changes are submitted, if at all, in a single, final web request. Restoring state for read-only web requests allows the application to continue using the database session as if the failure had never occurred. Therefore, the replay mechanisms described herein provide a significant advantage to database systems even if replay is disabled for some or all other web requests.

Users who are comfortable with the performance of an application, a mid-tier server, and a database server are generally loyal to their current software vendors. However, frustrated users may switch to other software vendors, whether or not those other software vendors objectively provide a better expected performance. An application, a mid-tier server, and a database server that allow a user to reliably interact with the application without the loss of information or session state may retain a higher percentage of users, draw more users, and/or increase the reputation of the application, the mid-tier server, or the database server, or even the company providing the application, the mid-tier server, or the database server. Techniques described herein will promote more reliable applications and servers that are less likely to session state, even if a database session fails after temporary entry, modification, selection, and/or arrangement of data.

Failing to Preserve Session State

In cases where replay is allowed to proceed on the second database session, and when the replay produces results that match the initial execution against the now-unavailable database instance, many of the negative effects that normally result from a session outage can be averted.

In one embodiment, when replay is avoided, the database session is not restarted, and the session state is not preserved. In another embodiment, the database session is restarted without preserving the session state that was established between the now unavailable database instance and the application. In either embodiment, replay would affect the application beyond a mere delay. Session state may also be lost when the results of replay on the new database session do not match the results of replay against the now unavailable database session. Attempts to use a new database session with non-preserved state, including any attempts to reference lost session state information, may result in errors or, worse, corruption of the data stored in the database. For this reason, any such deviation in results disables replay, the failed over session is discarded, and the application receives an error as replay did not happen. In one embodiment, before obtaining access to a new database session, the application is notified that the database session has failed and could not be restored. In response, the application may request a new session from the database server, request further information from the user, and handle the outage through a customized exception so that the application does not rely on any variables that existed in the unavailable database session. In one embodiment, if replay cannot be performed, while handling the exception, the application may gray out or lock fields that contain information that may no longer be congruent with information stored in the database.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
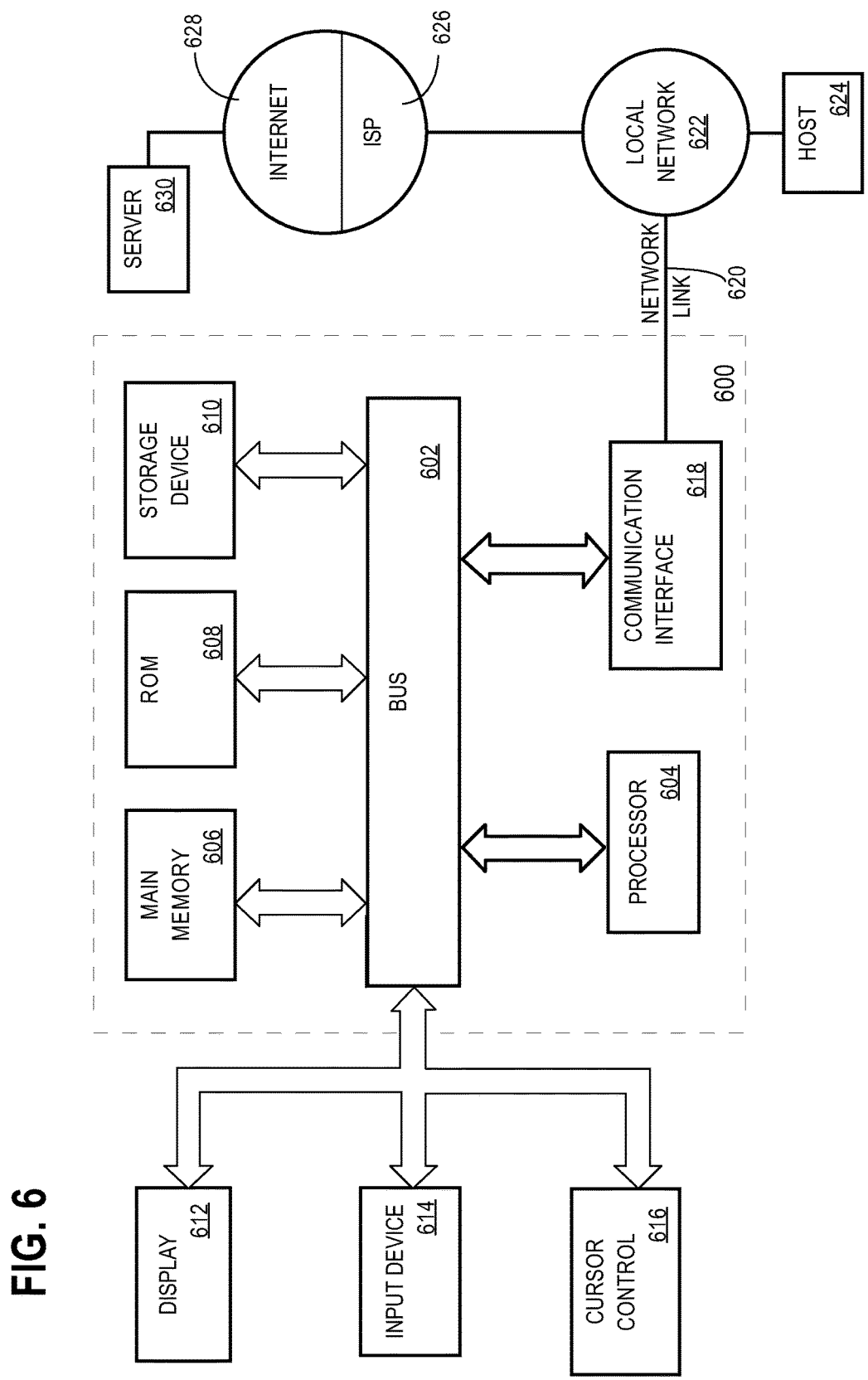
FIG. 6 illustrates an example computer system upon which techniques described herein may be implemented. In various embodiments, a set of such example computer systems or different computer systems, each of which may or may not include all of the components of the example computer system, may function together to provide the functionality described herein.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   during a first database session, maintaining, outside of the first database session, a set of commands selected from commands that were sent from a client for execution on the first database session;
   determining that the first database session has become unavailable;
   based at least in part on determining that the first database session has become unavailable, causing a session state to be rebuilt on a second database session at least in part by causing execution on the second database session of the set of commands previously sent by the client for execution on the first database session;
   wherein, as a result of causing the session state to be rebuilt, the session state is accessible to the client for executing commands on the second database session;
   wherein the method is performed by one or more computing devices.

2. The method of claim 1, wherein maintaining the set of commands comprises determining whether the commands sent on the first database session satisfy one or more criteria.

3. The method of claim 1, wherein maintaining the set of commands comprises purging the set of commands based at least in part on determining that at least one command, of the commands sent on the first database session, does not satisfy one or more criteria.

4. The method of claim 1, further comprising:
   receiving, on the first database session, a first set of results from executing at least part of the set of commands on the first database session;
   receiving, on the second database session, a second set of results from executing the at least part of the set of commands on the second database session;
   determining that the session state was correctly rebuilt on the second database session at least in part by verifying that the first set of results matches the second set of results.

5. The method of claim 1, further comprising:
   determining a first value using a procedure by inputting, to the procedure, a first set of results from executing at least part of the set of commands on the first database session, wherein the first value is smaller in size than the first set of results;
   determining a second value using the procedure by inputting, to the procedure, a second set of results from executing the at least part of the set of commands on the second database session, wherein the second value is smaller in size than the second set of results;
   determining that the session state was correctly rebuilt on the second database session at least in part by verifying that the first value matches the second value.

6. The method of claim 1, wherein one or more commands of the set of commands are executed on the second database session against one or more past database states in which the one or more commands were previously executed on the first database session, and wherein one or more other commands of the set of commands are executed on the second database session against current database states.

7. The method of claim 1, further comprising:
   receiving marked boundaries comprising begin markers at beginnings of requests and end markers at ends of the requests; and
   using the marked boundaries to delimit the requests to one or more server instances that process the requests.

8. The method of claim 1, further comprising, after causing execution of the set of commands on the second database session, causing execution of one or more other commands on the second database session; wherein at least one of the one or more other commands depends on the session state that was caused to be rebuilt on the second database session.

9. The method of claim 1, wherein the commands sent on the first database session are monitored and the set of commands are maintained by a driver logically positioned between an application and database instances corresponding to the first database session and the second database session.

10. The method of claim 1, further comprising, in response to determining that the session state has been successfully rebuilt on the second database session, causing operation of an application that originated the set of commands to continue using the second database session without interrupting operation of the application.

11. One or more non-transitory storage media storing instructions which, when executed by one or more processors, cause
    during a first database session, maintaining, outside of the first database session, a set of commands selected from commands that were sent from a client for execution on the first database session;
    determining that the first database session has become unavailable;
    based at least in part on determining that the first database session has become unavailable, causing a session state to be rebuilt on a second database session at least in part by causing execution on the second database session of the set of commands previously sent by the client for execution on the first database session;
    wherein, as a result of causing the session state to be rebuilt, the session state is accessible to the client for executing commands on the second database session.

12. The one or more non-transitory storage media of claim 11, wherein the instructions include instructions which, when executed by said one or more processors, cause maintaining the set of commands and which include one or more instructions which, when executed by said one or more processors, cause determining whether the commands sent on the first database session satisfy one or more criteria.

13. The one or more non-transitory storage media of claim 11, wherein the instructions include instructions which, when executed by said one or more processors, cause maintaining the set of commands and which include one or more instructions which, when executed by said one or more processors, cause purging the set of commands based at least in part on determining that at least one command, of the commands sent on the first database session, does not satisfy one or more criteria.

14. The one or more non-transitory storage media of claim 11, wherein the instructions include instruction, which, when executed by said one or more processors, further cause:
   receiving, on the first database session, a first set of results from executing at least part of the set of commands on the first database session;
   receiving, on the second database session, a second set of results from executing the at least part of the set of commands on the second database session;
   determining that the session state was correctly rebuilt on the second database session at least in part by verifying that the first set of results matches the second set of results.

15. The one or more non-transitory storage media of claim 11, wherein the instructions include instructions, which, when executed by said one or more processors, further cause:
   determining a first value using a procedure by inputting, to the procedure, a first set of results from executing at least part of the set of commands on the first database session, wherein the first value is smaller in size than the first set of results;
   determining a second value using the procedure by inputting, to the procedure, a second set of results from executing the at least part of the set of commands on the second database session, wherein the second value is smaller in size than the second set of results;
   determining that the session state was correctly rebuilt on the second database session at least in part by verifying that the first value matches the second value.

16. The one or more non-transitory storage media of claim 11, wherein one or more commands of the set of commands are executed on the second database session against one or more past database states in which the one or more commands were previously executed on the first database session, and wherein one or more other commands of the set of commands are executed on the second database session against current database states.

17. The one or more non-transitory storage media of claim 11, wherein the instructions include instruction, which, when executed by said one or more processors, further cause:
   receiving marked boundaries comprising begin markers at beginnings of requests and end markers at ends of the requests; and
   using the marked boundaries to delimit the requests to one or more server instances that process the requests.

18. The one or more non-transitory storage media of claim 11, wherein the instructions include instruction, which, when executed by said one or more processors, further cause, after causing execution of the set of commands on the second database session, execution of one or more other commands on the second database session; wherein at least one of the one or more other commands depends on the session state that was caused to be rebuilt on the second database session.

19. The one or more non-transitory storage media of claim 11, wherein the commands sent on the first database session are monitored and the set of commands are maintained by a driver logically positioned between an application and database instances corresponding to the first database session and the second database session.

20. The one or more non-transitory storage media of claim 11, wherein the instructions include instructions, which, when executed by said one or more processors, further cause, in response to determining that the session state has been successfully rebuilt on the second database session, operation of an application that originated the set of commands to continue using the second database session without interrupting operation of the application.

21. The method of claim 1, wherein, after causing the session state to be rebuilt, the session state is accessible to the client on the second database session as the session state would have been available to the client on the first database session if the first database session had not become unavailable.

22. The one or more non-transitory storage media of claim 11, wherein the instructions include instructions which, when executed by said one or more processors, cause, after causing the session state to be rebuilt, the session state to be accessible to the client on the second database session as the session state would have been available to the client on the first database session if the first database session had not become unavailable.

* * * * *

UNITED STATES PATENT AND TRADEMARK OFFICE
CERTIFICATE OF CORRECTION

Page 1 of 1

PATENT NO. : 9,779,116 B2
APPLICATION NO. : 13/936061
DATED : October 3, 2017
INVENTOR(S) : Colrain et al.

It is certified that error appears in the above-identified patent and that said Letters Patent is hereby corrected as shown below:

In Column 19, Line 6, after "transaction" insert -- . --.

In Column 38, Line 39, in Claim 11, after "cause" insert -- : --.

Signed and Sealed this
Twelfth Day of June, 2018

Andrei Iancu
*Director of the United States Patent and Trademark Office*